United States Patent
Nagamura

(10) Patent No.: US 12,367,054 B2
(45) Date of Patent: Jul. 22, 2025

(54) VEHICLE VIRTUALIZATION SYSTEM, TERMINAL DEVICE, IN-VEHICLE DEVICE, VIRTUALIZATION METHOD, AND VIRTUALIZATION PROGRAM

(71) Applicant: SUMITOMO ELECTRIC INDUSTRIES, LTD., Osaka (JP)

(72) Inventor: Yoshihisa Nagamura, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 1049 days.

(21) Appl. No.: 17/421,669

(22) PCT Filed: Jan. 18, 2019

(86) PCT No.: PCT/JP2019/001418
§ 371 (c)(1),
(2) Date: Jul. 8, 2021

(87) PCT Pub. No.: WO2020/148882
PCT Pub. Date: Jul. 23, 2020

(65) Prior Publication Data
US 2022/0083360 A1 Mar. 17, 2022

(51) Int. Cl.
G06F 9/44 (2018.01)
G06F 9/445 (2018.01)
G06F 9/455 (2018.01)

(52) U.S. Cl.
CPC ...... *G06F 9/45504* (2013.01); *G06F 9/44505* (2013.01)

(58) Field of Classification Search
CPC ................. G06F 1/32; G06F 9/44; G06F 1/12
See application file for complete search history.

(56) References Cited

U.S. PATENT DOCUMENTS 9,524,156 B2 * 12/2016 Pandya ................ G06F 8/65
2007/0290554 A1 12/2007 Teshima et al.
(Continued)

FOREIGN PATENT DOCUMENTS

CN 103373292 A 10/2013
EP 2650163 A1 10/2013
(Continued)

*Primary Examiner* — Keshab R Pandey
(74) *Attorney, Agent, or Firm* — Oliff PLC

(57) ABSTRACT

A vehicle virtualization system includes a terminal device, one or more in-vehicle devices, and a determination unit. The determination unit acquires terminal configuration information about a hardware configuration of the terminal device and in-vehicle configuration information about a hardware configuration of the in-vehicle device. The determination unit determines a virtual configuration of the terminal device and the in-vehicle device on the basis of the acquired terminal configuration information and the acquired in-vehicle configuration information, the virtual configuration being required for predetermined processing. The determination unit generates setting information for implementing the determined virtual configuration, and transmits the setting information to the terminal device and the in-vehicle device. The terminal device and the in-vehicle device each change settings thereof on the basis of the setting information received from the determination unit.

12 Claims, 11 Drawing Sheets

(56) References Cited

U.S. PATENT DOCUMENTS

2012/0253597 A1\* 10/2012 Nada ................. H04M 1/72415
                                                                                                    701/1
2020/0111270 A1\* 4/2020 Sato ....................... G06F 3/0619

FOREIGN PATENT DOCUMENTS

| JP | 2007-331712 A | 12/2007 |
| --- | --- | --- |
| JP | 2011-501839 A | 1/2011 |
| JP | 2012-160045 A | 8/2012 |
| JP | 2012-222403 A | 11/2012 |
| JP | 2018-055615 A | 4/2018 |
| WO | 2009/043379 A1 | 4/2009 |
| WO | 2013/171959 A1 | 11/2013 |
| WO | 2014/002194 A1 | 1/2014 |

\* cited by examiner

FIG. 3

| VLAN-ID | COMMUNICATION PORT ||||||
|---|---|---|---|---|---|---|
| | P1 | P2 | P3 | P4 | P5 | P6 |
| 100 | × | | | × | | |
| 200 | | × | | × | | |
| 300 | | | × | × | | |
| 600 | | | | × | | × |

| DESTINATION MAC ADDRESS | VLAN-ID | TRANSFER DESTINATION PORT |
|---|---|---|
| 00:11:22:33:44:06 | 600 | P6 |

| VLAN-ID | COMMUNICATION PORT ||||||
|---|---|---|---|---|---|---|
| | P1 | P2 | P3 | P4 | P5 | P6 |
| 100 | × | | | × | | |
| 200 | | × | | / | × | |
| 300 | | | × | × | | |
| 600 | | | | × | × | × |

VEHICLE VIRTUALIZATION SYSTEM, TERMINAL DEVICE, IN-VEHICLE DEVICE, VIRTUALIZATION METHOD, AND VIRTUALIZATION PROGRAM

TECHNICAL FIELD

The present invention relates to a vehicle virtualization system, a terminal device, an in-vehicle device, a virtualization method, and a virtualization program.

BACKGROUND ART

Japanese Unexamined Patent Application Publication No. 2007-331712 (Patent Literature 1) discloses a vehicle control system that includes detecting means and position changing means. The detecting means detects the number and positions of passengers about to get into a vehicle. On the basis of the detection made by the detecting means, the position changing means changes at least the position of a seat expected to be taken by each of the passengers, so as to allow more space for the passenger to get into the vehicle.

Also, for example, International Publication No. 2013/171959 (Patent Literature 2) discloses a vehicle network control device that includes a communication unit, a label information acquisition processing unit, and an operation control unit. The communication unit communicates with an in-vehicle network enabled device included in a device that is brought into, and used in, a vehicle. From the in-vehicle network enabled device, the label information acquisition processing unit acquires label information including state information set in accordance with a function of the brought-in device, and identifies the brought-in device, which is the source of the label information, as an object to be controlled. When the in-vehicle environment is in need of adjustment, the operation control unit transmits, through the communication unit, preset state information that is set beforehand in accordance with the state for which the adjustment is to be made.

CITATION LIST

Patent Literature

PTL 1: Japanese Unexamined Patent Application Publication No. 2007-331712
PTL 2: International Publication No. 2013/171959
PTL 3: Japanese Unexamined Patent Application Publication No. 2012-160045

SUMMARY OF INVENTION (1) A vehicle virtualization system according to the present disclosure includes a terminal device, one or more in-vehicle devices, and a determination unit. The determination unit acquires terminal configuration information about a hardware configuration of the terminal device and in-vehicle configuration information about a hardware configuration of the in-vehicle device. The determination unit determines a virtual configuration of the terminal device and the in-vehicle device on the basis of the acquired terminal configuration information and the acquired in-vehicle configuration information, the virtual configuration being required for performing predetermined processing. The determination unit generates setting information for implementing the determined virtual configuration, and transmits the setting information to the terminal device and the in-vehicle device. The terminal device and the in-vehicle device each change settings thereof on the basis of the setting information received from the determination unit.

(5) A terminal device according to the present disclosure includes an acquisition unit configured to acquire in-vehicle configuration information about a hardware configuration of an in-vehicle device; a determination unit configured to determine a virtual configuration of the terminal device and the in-vehicle device on the basis of the in-vehicle configuration information acquired by the acquisition unit and terminal configuration information about a hardware configuration of the terminal device, the virtual configuration being required for performing predetermined processing, the determination unit being configured to generate setting information for implementing the determined virtual configuration; a communication unit configured to transmit the setting information generated by the determination unit to the in-vehicle device; and a setting unit configured to change settings of the terminal device to be appropriate for the virtual configuration determined by the determination unit.

(6) An in-vehicle device according to the present disclosure includes a transmission unit configured to transmit in-vehicle configuration information about a hardware configuration of the in-vehicle device; a receiving unit configured to receive setting information for implementing a virtual configuration determined on the basis of the in-vehicle configuration information transmitted by the transmission unit, the virtual configuration being required for performing predetermined processing; and a setting unit configured to change settings of the in-vehicle device on the basis of the setting information received by the receiving unit.

(7) A virtualization method according to the present disclosure is a virtualization method in a vehicle virtualization system including a terminal device, one or more in-vehicle devices, and a determination unit. The virtualization method includes the steps of allowing the determination unit to acquire terminal configuration information about a hardware configuration of the terminal device and in-vehicle configuration information about a hardware configuration of the in-vehicle device; allowing the determination unit to determine a virtual configuration of the terminal device and the in-vehicle device on the basis of the acquired terminal configuration information and the acquired in-vehicle configuration information, the virtual configuration being required for performing predetermined processing; allowing the determination unit to generate setting information for implementing the determined virtual configuration and transmit the setting information to the terminal device and the in-vehicle device; and allowing the terminal device and the in-vehicle device each to change settings thereof on the basis of the setting information received from the determination unit.

(8) A virtualization method according to the present disclosure is a virtualization method in a terminal device. The virtualization method includes the steps of acquiring in-vehicle configuration information about a hardware configuration of an in-vehicle device; determining a virtual configuration of the terminal device and the in-vehicle device on the basis of the acquired in-vehicle configuration information and terminal configuration information about a hardware configuration of the terminal device, the virtual configuration being required for performing predetermined processing; generating setting information for implementing the determined virtual configuration and transmitting the setting information to the in-vehicle device; and changing settings of the terminal device to be appropriate for the determined virtual configuration.

(9) A virtualization method according to the present disclosure is a virtualization method in an in-vehicle device. The virtualization method includes the steps of transmitting in-vehicle configuration information about a hardware configuration of the in-vehicle device; receiving setting information for implementing a virtual configuration determined on the basis of the transmitted in-vehicle configuration information, the virtual configuration being required for performing predetermined processing; and changing settings of the in-vehicle device on the basis of the received setting information.

(10) A virtualization program according to the present disclosure is a virtualization program used in a terminal device. The virtualization program causes a computer to function as an acquisition unit configured to acquire in-vehicle configuration information about a hardware configuration of an in-vehicle device; a determination unit configured to determine a virtual configuration of the terminal device and the in-vehicle device on the basis of the in-vehicle configuration information acquired by the acquisition unit and terminal configuration information about a hardware configuration of the terminal device, the virtual configuration being required for performing predetermined processing, the determination unit being configured to generate setting information for implementing the determined virtual configuration; a communication unit configured to transmit the setting information generated by the determination unit to the in-vehicle device; and a setting unit configured to change settings of the terminal device to be appropriate for the virtual configuration determined by the determination unit.

(11) A virtualization program according to the present disclosure is a virtualization program used in an in-vehicle device. The virtualization program causes a computer to function as a transmission unit configured to transmit in-vehicle configuration information about a hardware configuration of the in-vehicle device; a receiving unit configured to receive setting information for implementing a virtual configuration determined on the basis of the in-vehicle configuration information transmitted by the transmission unit, the virtual configuration being required for performing predetermined processing; and a setting unit configured to change settings of the in-vehicle device on the basis of the setting information received by the receiving unit.

An aspect of the present disclosure may be implemented not only as a vehicle virtualization system that includes characteristic processing units such as those described above, but also as a semiconductor integrated circuit that constitutes part of or the entire vehicle virtualization system.

Another aspect of the present disclosure may be implemented not only as a terminal device that includes characteristic processing units such as those described above, but also as a semiconductor integrated circuit that constitutes part of or the entire terminal device.

Another aspect of the present disclosure may be implemented not only as an in-vehicle device that includes characteristic processing units such as those described above, but also as a semiconductor integrated circuit that constitutes part of or the entire in-vehicle device.

BRIEF DESCRIPTION OF DRAWINGS

FIG. 3 is a diagram illustrating an exemplary VLAN table held in an in-vehicle device according to the first embodiment of the present invention, specifically illustrating the table before setting change.

FIG. 4 is a diagram illustrating an exemplary transfer destination table held in an in-vehicle device according to the first embodiment of the present invention, specifically illustrating the table before setting change.

FIG. 6 is a diagram illustrating an exemplary VLAN table held in an in-vehicle device according to the first embodiment of the present invention, specifically illustrating the table after setting change.

DESCRIPTION OF EMBODIMENTS

Figure 1:
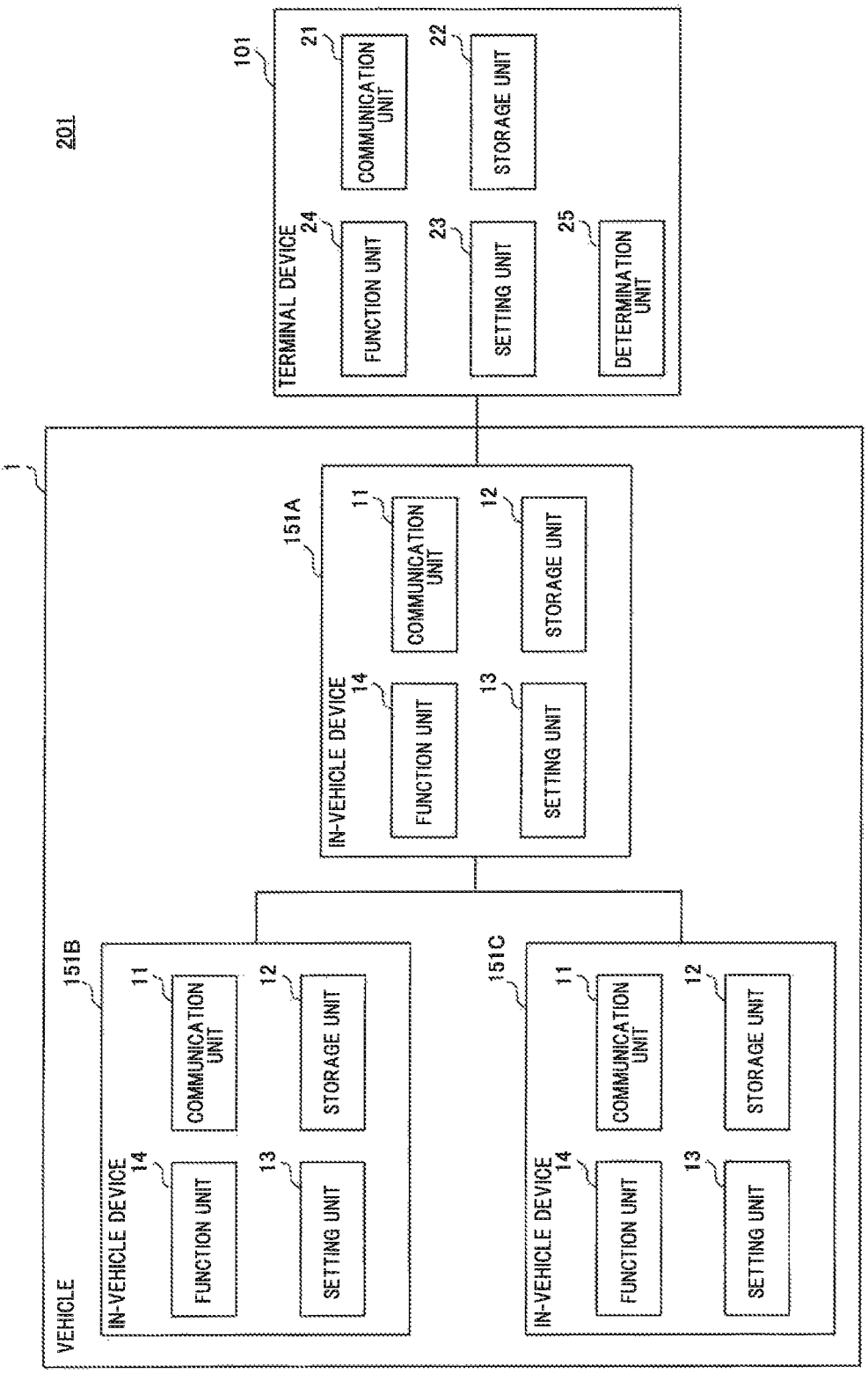
FIG. 1 is a diagram illustrating a configuration of a vehicle virtualization system according to a first embodiment of the present invention.

With the growth of carsharing and mobility-as-a-service (MaaS), techniques for providing appropriate in-vehicle services to users have been developed.

Problems to be Solved by Present Disclosure

The vehicle control system according to Patent Literature 1 and the vehicle network control device according to Patent Literature 2 are designed to adjust a predetermined function of an in-vehicle device or a device brought into the vehicle, and are not capable of adjusting other functions. There has been a desire for better techniques that can flexibly and easily improve services provided in the vehicle.

The present disclosure has been made to solve the problem described above. An object of the present disclosure is to provide a vehicle virtualization system, a terminal device, an in-vehicle device, a virtualization method, and a virtualization program that can flexibly and easily improve services provided in the vehicle.

Advantageous Effects of Present Disclosure

The present disclosure can flexibly and easily improve services provided in the vehicle.

Description of Embodiments of Invention of Present Application

Embodiments of the present invention are listed below.

(1) A vehicle virtualization system according to an embodiment of the present invention includes a terminal device, one or more in-vehicle devices, and a determination unit. The determination unit acquires terminal configuration information about a hardware configuration of the terminal device and in-vehicle configuration information about a hardware configuration of the in-vehicle device. The determination unit determines a virtual configuration of the terminal device and the in-vehicle device on the basis of the acquired terminal configuration information and the acquired in-vehicle configuration information, the virtual configuration being required for performing predetermined processing. The determination unit generates setting information for implementing the determined virtual configuration and transmits the setting information to the terminal device and the in-vehicle device. The terminal device and the in-vehicle device each change settings thereof on the basis of the setting information received from the determination unit.

As described above, the determination unit determines the virtual configuration required for predetermined processing on the basis of information about the hardware configuration of the in-vehicle device, and then the settings of the in-vehicle device and the terminal device are changed to implement the virtual configuration. The user can thus receive desired services in various vehicles by bringing the terminal device into the vehicles. For example, without adding too many capabilities to the in-vehicle device, services in the vehicle can be improved at low cost, as the performance of the terminal device improves. It is thus possible to flexibly and easily improve services provided in the vehicle.

(2) Preferably, the determination unit is included in the terminal device, the terminal device includes a storage unit configured to store processing information about the predetermined processing, and the determination unit determines the virtual configuration on the basis of the processing information stored in the storage unit.

For example, this configuration allows the in-vehicle device to execute a program involving predetermined processing and held in the terminal device and extends the functionality of the in-vehicle device, or allows the terminal device to execute the program and provide services that cannot be provided by the in-vehicle device.

(3) More preferably, the processing information represents a correspondence between the predetermined processing and information about resources required for the predetermined processing, and the terminal device updates the processing information with new processing information acquired from a network.

This configuration makes it possible to acquire the latest processing information and change the predetermined processing performed by the in-vehicle device or the terminal device.

(4) Preferably, the determination unit is included in the terminal device; the in-vehicle device includes a storage unit configured to store processing information about the predetermined processing, and transmits the processing information stored in the storage unit to the determination unit; and the determination unit determines the virtual configuration on the basis of the processing information received from the in-vehicle device.

For example, this configuration allows the terminal device to execute a program involving predetermined processing and held in the in-vehicle device, and allows effective use of resources in the terminal device.

(5) A terminal device according to another embodiment of the present invention includes an acquisition unit configured to acquire in-vehicle configuration information about a hardware configuration of an in-vehicle device; a determination unit configured to determine a virtual configuration of the terminal device and the in-vehicle device on the basis of the in-vehicle configuration information acquired by the acquisition unit and terminal configuration information about a hardware configuration of the terminal device, the virtual configuration being required for performing predetermined processing, the determination unit being configured to generate setting information for implementing the determined virtual configuration; a communication unit configured to transmit the setting information generated by the determination unit to the in-vehicle device; and a setting unit configured to change settings of the terminal device to be appropriate for the virtual configuration determined by the determination unit.

As described above, the determination unit determines the virtual configuration required for predetermined processing on the basis of information about the hardware configuration of the in-vehicle device, and then settings of the in-vehicle device and the terminal device are changed to implement the virtual configuration. The user can thus receive desired services in various vehicles by bringing the terminal device into the vehicles. For example, without adding too many capabilities to the in-vehicle device, services in the vehicle can be improved at low cost, as the performance of the terminal device improves. It is thus possible to flexibly and easily improve services provided in the vehicle.

(6) An in-vehicle device according to another embodiment of the present invention includes a transmission unit configured to transmit in-vehicle configuration information about a hardware configuration of the in-vehicle device; a receiving unit configured to receive setting information for implementing a virtual configuration determined on the basis of the in-vehicle configuration information transmitted by the transmission unit, the virtual configuration being required for performing predetermined processing; and a setting unit configured to change settings of the in-vehicle device on the basis of the setting information received by the receiving unit.

This configuration makes it possible to implement the virtual configuration determined on the basis of information about the hardware configuration of the in-vehicle device, and thus to allow the user to receive desired services in the vehicle. For example, without adding too many capabilities to the in-vehicle device, services in the vehicle can be improved at low cost. It is thus possible to flexibly and easily improve services provided in the vehicle.

(7) A virtualization method according to another embodiment of the present invention is a virtualization method in a vehicle virtualization system including a terminal device, one or more in-vehicle devices, and a determination unit. The virtualization method includes the steps of allowing the determination unit to acquire terminal configuration information about a hardware configuration of the terminal device and in-vehicle configuration information about a hardware configuration of the in-vehicle device; allowing the determination unit to determine a virtual configuration of the terminal device and the in-vehicle device on the basis of the acquired terminal configuration information and the acquired in-vehicle configuration information, the virtual configuration being required for performing predetermined processing; allowing the determination unit to generate setting information for implementing the determined virtual configuration and transmit the setting information to the terminal device and the in-vehicle device; and allowing the terminal device and the in-vehicle device each to change settings thereof on the basis of the setting information received from the determination unit.

As described above, the determination unit determines the virtual configuration required for predetermined processing on the basis of information about the hardware configuration of the in-vehicle device, and then the settings of the in-vehicle device and the terminal device are changed to implement the virtual configuration. The user can thus receive desired services in various vehicles by bringing the terminal device into the vehicles. For example, without adding too many capabilities to the in-vehicle device, services in the vehicle can be improved at low cost, as the performance of the terminal device improves. It is thus possible to flexibly and easily improve services provided in the vehicle.

(8) A virtualization method according to another embodiment of the present invention is a virtualization method in a terminal device. The virtualization method includes the steps of acquiring in-vehicle configuration information about a hardware configuration of an in-vehicle device; determining a virtual configuration of the terminal device and the in-vehicle device on the basis of the acquired in-vehicle configuration information and terminal configuration information about a hardware configuration of the terminal device, the virtual configuration being required for performing predetermined processing; generating setting information for implementing the determined virtual configuration and transmitting the setting information to the in-vehicle device; and changing settings of the terminal device to be appropriate for the determined virtual configuration.

As described above, the terminal device determines the virtual configuration required for predetermined processing on the basis of information about the hardware configuration of the in-vehicle device, and then the settings of the in-vehicle device and the terminal device are changed to implement the virtual configuration. The user can thus receive desired services in various vehicles by bringing the terminal device into the vehicles. For example, without adding too many capabilities to the in-vehicle device, services in the vehicle can be improved at low cost, as the performance of the terminal device improves. It is thus possible to flexibly and easily improve services provided in the vehicle.

(9) A virtualization method according to another embodiment of the present invention is a virtualization method in an in-vehicle device. The virtualization method includes the steps of transmitting in-vehicle configuration information about a hardware configuration of the in-vehicle device; receiving setting information for implementing a virtual configuration determined on the basis of the transmitted in-vehicle configuration information, the virtual configuration being required for performing predetermined processing; and changing settings of the in-vehicle device on the basis of the received setting information.

With this method, it is possible to implement the virtual configuration determined on the basis of information about the hardware configuration of the in-vehicle device, and thus to allow the user to receive desired services in the vehicle. For example, without adding too many capabilities to the in-vehicle device, services in the vehicle can be improved at low cost. It is thus possible to flexibly and easily improve services provided in the vehicle.

(10) A virtualization program according to another embodiment of the present invention is a virtualization program used in a terminal device. The virtualization program causes a computer to function as an acquisition unit configured to acquire in-vehicle configuration information about a hardware configuration of an in-vehicle device; a determination unit configured to determine a virtual configuration of the terminal device and the in-vehicle device on the basis of the in-vehicle configuration information acquired by the acquisition unit and terminal configuration information about a hardware configuration of the terminal device, the virtual configuration being required for performing predetermined processing, the determination unit being configured to generate setting information for implementing the determined virtual configuration; a communication unit configured to transmit the setting information generated by the determination unit to the in-vehicle device; and a setting unit configured to change settings of the terminal device to be appropriate for the virtual configuration determined by the determination unit.

As described above, the determination unit determines the virtual configuration required for predetermined processing on the basis of information about the hardware configuration of the in-vehicle device, and then the settings of the in-vehicle device and the terminal device are changed to implement the virtual configuration. The user can thus receive desired services in various vehicles by bringing the terminal device into the vehicles. For example, without adding too many capabilities to the in-vehicle device, services in the vehicle can be improved at low cost, as the performance of the terminal device improves. It is thus possible to flexibly and easily improve services provided in the vehicle.

(11) A virtualization program according to another embodiment of the present invention is a virtualization program used in an in-vehicle device. The virtualization program causes a computer to function as a transmission unit configured to transmit in-vehicle configuration information about a hardware configuration of the in-vehicle device; a receiving unit configured to receive setting information for implementing a virtual configuration determined on the basis of the in-vehicle configuration information transmitted by the transmission unit, the virtual configuration being required for performing predetermined processing; and a setting unit configured to change settings of the in-vehicle device on the basis of the setting information received by the receiving unit.

This configuration makes it possible to implement the virtual configuration determined on the basis of information about the hardware configuration of the in-vehicle device, and thus to allow the user to receive desired services in the vehicle. For example, without adding too many capabilities to the in-vehicle device, services in the vehicle can be improved at low cost. It is thus possible to flexibly and easily improve services provided in the vehicle.

Embodiments of the present invention will now be described with reference to the drawings. The same or corresponding parts in the drawings are assigned the same reference numerals and their description will not be repeated. At least some of the embodiments described below may be combined where appropriate.

First Embodiment

[Configuration and Basic Operations]
(Configuration of Vehicle Virtualization System)

FIG. 1 is a diagram illustrating a configuration of a vehicle virtualization system according to a first embodiment of the present invention.

Referring to FIG. 1, a vehicle virtualization system 201 includes a terminal device 101 and one or more in-vehicle devices 151 installed in a vehicle 1. FIG. 1 illustrates three in-vehicle devices 151A, 151B, and 151C as an example. Hereinafter, the in-vehicle devices 151A, 151B, and 151C are each also referred to as "in-vehicle device 151".

The in-vehicle device 151 is, for example, an Ethernet switch (ESW) or an electronic control unit (ECU). The three in-vehicle devices 151 are connected, for example, by a CAN bus compliant with a Controller Area Network (CAN) (registered trademark) standard, or by an Ethernet (registered trademark) cable.

At least one of the in-vehicle device 151B and the in-vehicle device 151C may be configured to wirelessly communicate with the in-vehicle device 151A.

The in-vehicle device 151 includes a communication unit (transmission unit and receiving unit) 11, a storage unit 12, a setting unit 13, and a function unit 14.

The terminal device 101 includes a communication unit (acquisition unit) 21, a storage unit 22, a setting unit 23, a function unit 24, and a determination unit 25.

The storage unit 12 of the in-vehicle device 151 is, for example, a nonvolatile memory. The storage unit 12 stores in-vehicle configuration information about a hardware configuration of the in-vehicle device 151. The in-vehicle configuration information represents not only the hardware configuration, but also an address such as an IP address, processing capability, available storage capacity, available functions, a network identification (ID), communication speed, and an available communication band of the in-vehicle device 151.

The processing capability of the in-vehicle device 151 is numerically expressed, for example, in million instructions per second (MIPS) or floating-point operations per second (FLOPS). The storage capacity of the in-vehicle device 151 is numerically expressed, for example, in bytes.

The available functions of the in-vehicle device 151 include, for example, the image capturing function of a high-definition (HD) camera, or the communication function of broadband wireless equipment.

For example, when the terminal device 101 is brought into the vehicle 1, the communication unit 11 of the in-vehicle device 151A performs processing for establishing a communication connection with the terminal device 101. This enables the terminal device 101 to be connected to an in-vehicle network. The in-vehicle device 151A and the terminal device 101 may be connected by a physical line or may be wirelessly connected, for example, via Bluetooth (registered trademark) or Wi-Fi (registered trademark).

Also, the communication unit 11 of the in-vehicle device 151A requests the transmission of in-vehicle configuration information from, for example, the in-vehicle device 151B and the in-vehicle device 151C.

Upon receiving the request from the in-vehicle device 151A, the communication unit 11 of each of the in-vehicle device 151B and the in-vehicle device 151C transmits in-vehicle configuration information stored in the storage unit 12 to the in-vehicle device 151A.

The communication unit 11 of the in-vehicle device 151A transmits, to the terminal device 101, the two pieces of in-vehicle configuration information transmitted from the in-vehicle device 151B and the in-vehicle device 151C as well as in-vehicle configuration information stored in the storage unit 12 of the in-vehicle device 151A.

The communication unit 21 of the terminal device 101 receives the plurality of pieces of in-vehicle configuration information transmitted from the in-vehicle device 151A and outputs the received plurality of pieces of in-vehicle configuration information to the determination unit 25.

The storage unit 22 of the terminal device 101 is, for example, a nonvolatile memory. The storage unit 22 stores terminal configuration information about a hardware configuration of the terminal device 101. The terminal configuration information includes not only the hardware configuration, but also an address such as an IP address, processing capability, available storage capacity, available functions, a network ID, communication speed, and an available communication band of the terminal device 101.

Upon receiving the plurality of pieces of in-vehicle configuration information output from the communication unit 21, the determination unit 25 determines, on the basis of the plurality of pieces of in-vehicle configuration information and the terminal configuration information stored in the storage unit 22, a virtual configuration of the terminal device 101 and the plurality of in-vehicle devices 151 for performing predetermined processing.

Specifically, the storage unit 22 of the terminal device 101 stores processing information about the predetermined processing. The processing information represents, for example, a correspondence between predetermined processing and information about resources required for the predetermined processing.

More specifically, the processing information includes, for example, a network configuration required for executing predetermined processing, a program used for the predetermined processing, a processing capability required for the predetermined processing, a storage capacity required for the predetermined processing, and information about functions required for the predetermined processing.

The communication unit 21 may communicate with, for example, a server on an external network to acquire new processing information from the external network, and update the processing information in the storage unit 22 with the new processing information.

The determination unit 25 uses, for example, in-vehicle configuration information of each in-vehicle device 151 in combination with terminal configuration information of the terminal device 101 to calculate a virtual configuration, that is, the network configuration or the arrangement of function units for executing predetermined processing. The determination unit 25 then determines, for example, parameters to be set for each device.

Specifically, the determination unit 25 determines a virtual configuration, for example, for network virtualization, hardware virtualization, storage virtualization, distribution of processing through remote procedure call (RPC), or integration of computational resources.

Network virtualization is implemented, for example, by a virtual local area network (VLAN), virtual switches, virtual routers, software defined networking (SDN), or network functions virtualization (NFV).

Hardware virtualization is implemented, for example, by containers or hypervisor. Storage virtualization is implemented, for example, by redundant arrays of inexpensive disks (RAID) or storage area network (SAN).

The determination unit 25 generates setting information for implementing the determined virtual configuration. The setting information includes VLAN IDs, an address such as an IP address, a data destination address, relay point addresses, storage capacity to be used, computing power to be used, a function to be used, and a network function, such as network address translation (NAT), network address and port translation (NAPT), or firewall.

The determination unit 25 may generate setting information for each of the in-vehicle devices 151A, 151B, and 151C and the terminal device 101, or may generate one or more pieces of setting information corresponding to one or more of the in-vehicle devices 151A, 151B, and 151C and the terminal device 101. The determination unit 25 transmits the generated one or more pieces of setting information through the communication unit 21 to the in-vehicle device 151A. At the same time, the determination unit 25 outputs the generated setting information corresponding to the terminal device 101 to the setting unit 23.

Upon receiving the setting information output from the determination unit 25, the setting unit 23 changes, on the basis of the setting information, the settings of the terminal device 101 to be appropriate for the virtual configuration determined by the determination unit 25.

The function unit 24 of the terminal device 101 provides a virtualization function in accordance with the settings made by the setting unit 23.

The communication unit 11 of the in-vehicle device 151A receives the one or more pieces of setting information transmitted from the terminal device 101 and identifies, for example, the destination address included in each setting information received. When setting information corresponding to the in-vehicle device 151A is identified, the communication unit 11 outputs the setting information to the setting unit 13.

Upon receiving the setting information output from the communication unit 11, the setting unit 13 changes the settings of the in-vehicle device 151A on the basis of the setting information.

The function unit 14 of the in-vehicle device 151A provides a virtualization function in accordance with the settings made by the setting unit 13.

When setting information corresponding to the in-vehicle device 151B or the in-vehicle device 151C is received, the communication unit 11 of the in-vehicle device 151A transfers the setting information to the in-vehicle device 151B or the in-vehicle device 151C.

When setting information transmitted from the in-vehicle device 151A is received, the communication unit 11 of the in-vehicle device 151B outputs the setting information to the setting unit 13 of the in-vehicle device 151B, or the communication unit 11 of the in-vehicle device 151C outputs the setting information to the setting unit 13 of the in-vehicle device 151C. Upon receiving the setting information output from the communication unit 11, the setting unit 13 of the in-vehicle device 151B changes the settings of the in-vehicle device 151B on the basis of the received setting information, or the setting unit 13 of the in-vehicle device 151C changes the settings of the in-vehicle device 151C on the basis of the received setting information.

[Application 1 of Vehicle Virtualization System]

This section deals with an example where the terminal device 101 determines a virtual network as a virtual configuration, and the in-vehicle device 151 and the terminal device 101 change VLAN settings for implementing the virtual configuration determined by the terminal device 101.

(Before Setting Change)

Figure 2:
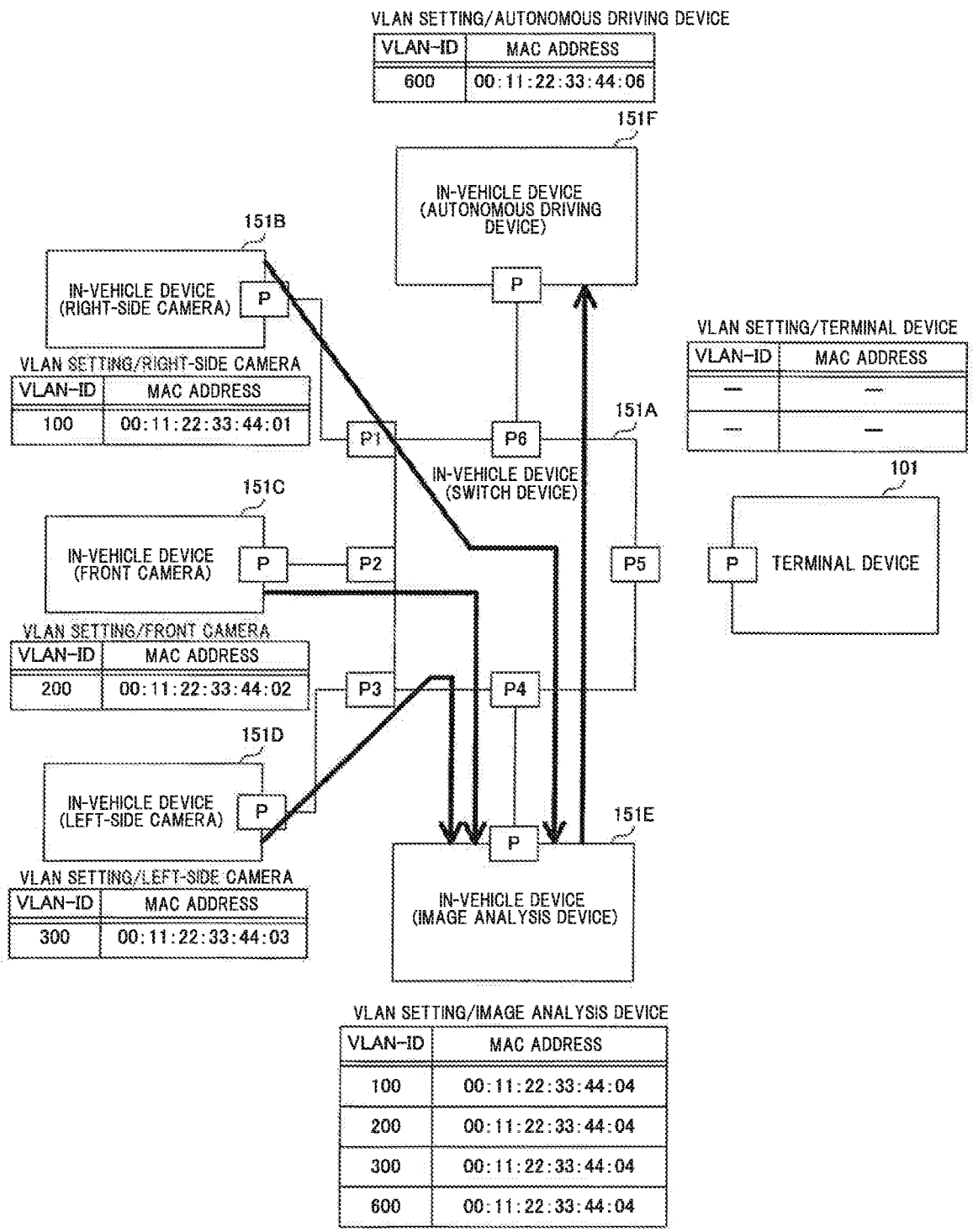
FIG. 2 is a diagram illustrating an application of the vehicle virtualization system according to the first embodiment of the present invention, specifically illustrating a state before settings of the in-vehicle devices and the terminal device are changed.

FIG. 2 is a diagram illustrating an application of the vehicle virtualization system according to the first embodiment of the present invention, specifically illustrating a state before settings of the in-vehicle devices and the terminal device are changed.

Referring to FIG. 2, the vehicle 1 is equipped with six in-vehicle devices 151A, 151B, 151C, 151D, 151E, and 151F. The in-vehicle device 151A communicates with the terminal device 101. Also, the in-vehicle device 151A relays data transmitted and received between the in-vehicle devices 151B, 151C, 151D, 151E, and 151F. The in-vehicle device 151A is also referred to as "switch device 151A" here.

The in-vehicle device 151B is, for example, an image capturing device that captures an image of a region to the right side of the vehicle 1. The in-vehicle device 151B is also referred to as "right-side camera 151B" here. An ID for a VLAN to which the right-side camera 151B belongs is "100".

The in-vehicle device 151C is, for example, an image capturing device that captures an image of a region in front of the vehicle 1. The in-vehicle device 151C is also referred to as "front camera 151C" here. An ID for a VLAN to which the front camera 151C belongs is "200".

The in-vehicle device 151D is, for example, an image capturing device that captures an image of a region to the left side of the vehicle 1. The in-vehicle device 151D is also referred to as "left-side camera 151D" here. An ID for a VLAN to which the left-side camera 151D belongs is "300".

The in-vehicle device 151E acquires, for example, one or more images captured individually by the right-side camera 151B, the front camera 151C, and the left-side camera 151D through the switch device 151A, and analyzes the acquired one or more captured images to detect an object, such as a pedestrian or a vehicle, around the vehicle 1. The in-vehicle device 151E is also referred to as "image analysis device 151E" here. The image analysis device 151E belongs to the four VLANs corresponding to the respective IDs "100", "200", "300", and "600".

The in-vehicle device 151F acquires, for example, the result of detection made by the image analysis device 151E through the switch device 151A, and performs control over autonomous driving of the vehicle 1 on the basis of the acquired result of detection. The in-vehicle device 151F is also referred to as "autonomous driving device 151F" here. An ID for a VLAN to which the in-vehicle device 151F belongs is "600".

The switch device 151A holds, for example, a VLAN table T1 that shows a correspondence between VLAN ID and port number.

FIG. 3 is a diagram illustrating an exemplary VLAN table held in an in-vehicle device according to the first embodiment of the present invention, specifically illustrating the table before setting change.

Referring to FIG. 3, the VLAN table T1 associates the VLAN-ID "100" with the port numbers "P1" and "P4" corresponding to the right-side camera 151B and the image analysis device 151E, respectively. The VLAN table T1 also associates the VLAN-ID "200" with the port numbers "P2" and "P4" corresponding to the front camera 151C and the image analysis device 151E, respectively.

The VLAN table T1 also associates the VLAN-ID "300" with the port numbers "P3" and "P4" corresponding to the left-side camera 151D and the image analysis device 151E, respectively. The VLAN table T1 also associates the VLAN-ID "600" with the port numbers "P4" and "P6" corresponding to the image analysis device 151E and the autonomous driving device 151F, respectively.

Also, the switch device 151A holds, for example, a transfer destination table T2 that shows a transfer destination to which detection information representing a result of detection of an object obtained by image analysis is directed.

FIG. 4 is a diagram illustrating an exemplary transfer destination table held in an in-vehicle device according to the first embodiment of the present invention, specifically illustrating the table before setting change.

Referring to FIG. 4, the transfer destination table T2 shows that when a destination MAC address contained in a frame received by the switch device 151A is the MAC address "00:11:22:33:44:06" of the autonomous driving device 151F and a VLAN-ID contained in the frame is "600", then a communication port with the port number "P6" is a transfer destination port.

Referring back to FIG. 2, the right-side camera 151B generates, for example, a frame containing image data of a captured image and broadcasts the generated frame. The frame contains the MAC address "00:11:22:33:44:01" of the right-side camera 151B and the broadcast address "FF:FF:FF:FF:FF:FF" as a source address and a destination address, respectively.

The switch device 151A receives the frame transmitted from the right-side camera 151B, refers to the destination address contained in the received frame as well as the VLAN table T1 held therein, and transfers the frame to the image analysis device 151E belonging to the same VLAN as the right-side camera 151B.

Like the right-side camera 151B, the front camera 151C and the left-side camera 151D each generate a frame containing image data of a captured image and broadcasts the generated frame. The switch device 151A receives the frame transmitted from the front camera 151C or the left-side camera 151D, and transfers the frame to the image analysis device 151E.

The image analysis device 151E receives the frame transferred from the switch device 151A, and performs image analysis on the basis of the image data contained in the frame to detect an object around the vehicle 1. The image analysis device 151E then generates a frame containing detection information representing the result of detection, and transmits the generated frame to the switch device 151A. The frame contains the MAC address "00:11:22:33:44:04" of the image analysis device 151E and the MAC address "00:11:22:33:44:06" of the autonomous driving device 151F as a source address and a destination address, respectively.

The switch device 151A receives the frame transmitted from the image analysis device 151E, refers to the destination address contained in the received frame as well as the VLAN table T1 and the transfer destination table T2 held therein, and transfers the frame to the autonomous driving device 151F.

The autonomous driving device 151F receives the frame transferred from the switch device 151A, and performs control over autonomous driving of the vehicle 1 on the basis of the detection information contained in the frame.

(After Setting Change)

Figure 5:
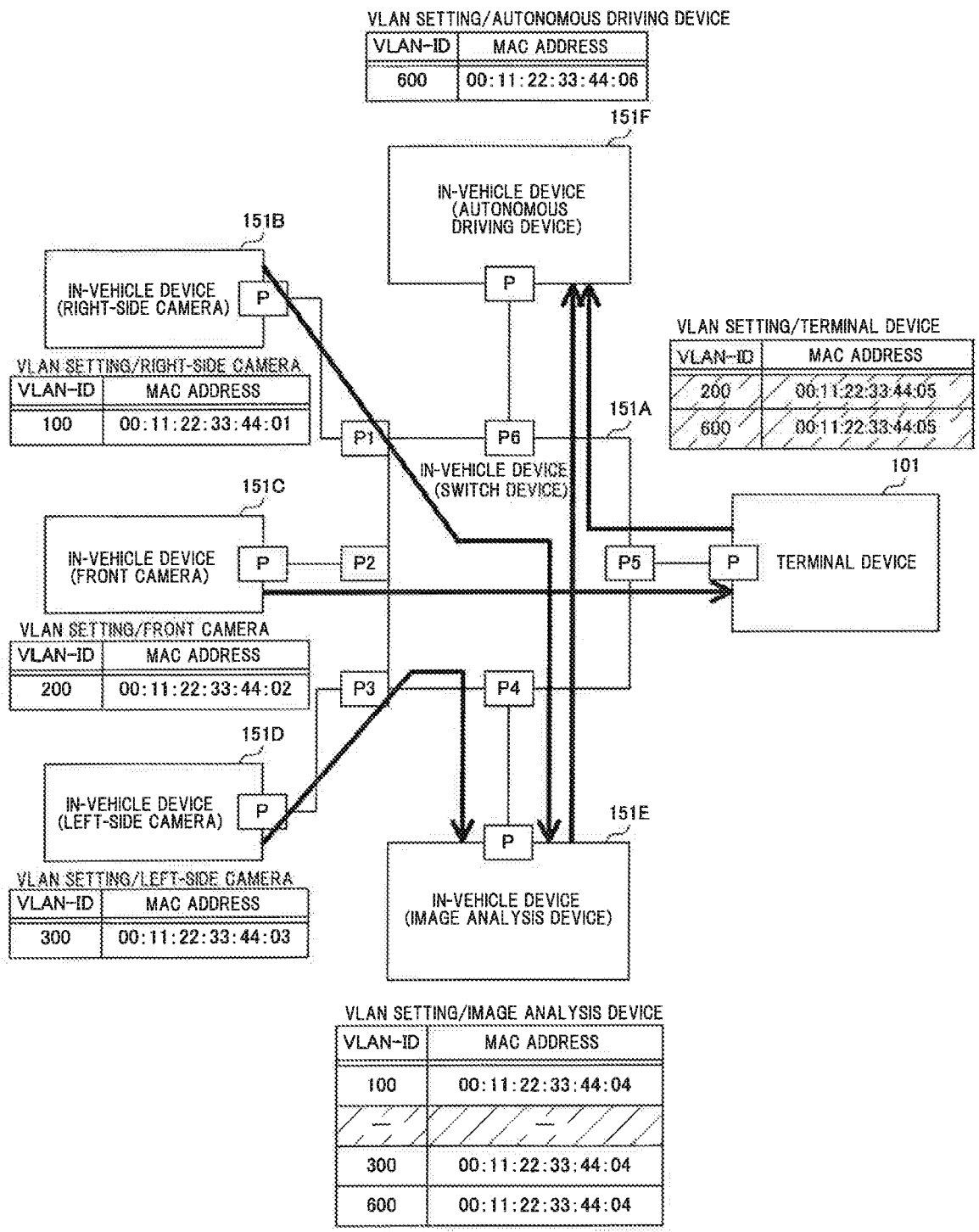
FIG. 5 is a diagram illustrating an application of the vehicle virtualization system according to the first embodiment of the present invention, specifically illustrating a state after settings of the in-vehicle devices and the terminal device are changed.

FIG. 5 is a diagram illustrating an application of the vehicle virtualization system according to the first embodiment of the present invention, specifically illustrating a state after settings of the in-vehicle devices and the terminal device are changed.

Referring to FIG. 5, when the terminal device 101 is brought into the vehicle 1, the terminal device 101 performs processing for establishing a communication connection with the switch device 151A.

When the communication connection with the terminal device 101 is established, the switch device 151A acquires in-vehicle configuration information from each of the in-vehicle devices 151B to 151F. The switch device 151A may acquire in-vehicle configuration information from each of the in-vehicle devices 151B to 151F before the communication connection with the terminal device 101 is established.

The switch device 151A then transmits a total of six pieces of in-vehicle configuration information, including five pieces of in-vehicle configuration information corresponding to the respective in-vehicle devices 151B to 151F and in-vehicle configuration information held in the switch device 151A, to the terminal device 101.

The terminal device 101 transmits terminal configuration information held therein to the switch device 151A. The communication unit 11 of the in-vehicle device 151A receives the terminal configuration information transmitted from the terminal device 101 and stores the terminal configuration information as, for example, log information in the storage unit 12. The terminal device 101 may be configured not to transmit the terminal configuration information to the switch device 151A.

The terminal device 101 receives the six pieces of in-vehicle configuration information transmitted from the switch device 151A, and determines a virtual configuration of the terminal device 101 and the in-vehicle devices 151A to 151F on the basis of the received six pieces of in-vehicle configuration information as well as the terminal configuration information and processing information held in the terminal device 101.

Here, predetermined processing represented by the processing information is processing which involves performing image analysis on a captured image. In this case, the terminal device 101 determines the virtual configuration in such a way that the terminal device 101 performs, for example, part of the image analysis performed by the image analysis device 151E, or specifically, the image analysis performed on the image captured by the front camera 151C.

Then, as settings for the terminal device 101, for example, the terminal device 101 registers information indicating that the terminal device 101 belongs to two VLANs corresponding to the ID "200" and the ID "600" and that the MAC address of the terminal device 101 is "00:11:22:33:44:05".

As setting information for implementing the determined virtual configuration, the terminal device 101 generates, for example, setting information corresponding to the switch device 151A and setting information corresponding to the image analysis device 151E. The terminal device 101 then transmits the generated two pieces of setting information to the switch device 151A.

From the terminal device 101, the switch device 151A receives the two pieces of setting information generated by the terminal device 101. On the basis of one of the two pieces of setting information, or specifically, on the basis of the setting information corresponding to the switch device 151A, the switch device 151A updates the VLAN table T1 to change the settings of the switch device 151A.

FIG. 6 is a diagram illustrating an exemplary VLAN table held in an in-vehicle device according to the first embodiment of the present invention, specifically illustrating the table after setting change.

Referring to FIG. 6, specifically, the switch device 151A changes the port numbers corresponding to the VLAN with the VLAN-ID "200", from "P2" and "P4" to "P2" and "P5". The port number "P5" is the port number of the communication port corresponding to the terminal device 101. Also, the switch device 151A changes the port numbers corresponding to the VLAN with the VLAN-ID "600", from "P4" and "P6" to "P4", "P5", and "P6".

Referring back to FIG. 5, the switch device 151A transfers, to the image analysis device 151E, the other of the two pieces of setting information received from the terminal device 101, or specifically, the setting information corresponding to the image analysis device 151E.

The image analysis device 151E receives the setting information transferred from the switch device 151A. On the basis of the setting information, the image analysis device 151E changes the VLANs to which the image analysis device 151E belongs, from four VLANs corresponding to the IDs "100", "200", "300", and "600" to three VLANs corresponding to the IDs "100", "300", and "600".

When this setting change takes place, the switch device 151A receives the frame transmitted from the front camera 151C, refers to the destination address contained in the received frame as well as the VLAN table T1 held therein, and transfers the frame to the terminal device 101. The switch device 151A also receives the frame transmitted from the right-side camera 151B or the left-side camera 151D, refers to the destination address contained in the received frame as well as the VLAN table T1 held therein, and transfers the frame to the image analysis device 151E.

The image analysis device 151E receives each frame transferred from the switch device 151A, as in the state illustrated in FIG. 2, performs image analysis on the basis of image data contained in the received frame so as to detect an object in a region to the right side and a region to the left side of the vehicle 1, and transmits the frame containing the result of the detection to the switch device 151A.

The terminal device 101 receives the frame transferred from the switch device 151A and executes, for example, an image analysis program held by the terminal device 101. The terminal device 101 thus performs image analysis on the basis of the image data contained in the frame to detect an object in front of the vehicle 1, and transmits a frame containing detection information representing the result of the detection to the switch device 151A.

The switch device 151A receives the frame transmitted from the image analysis device 151E, refers to the destination address contained in the received frame as well as the VLAN table T1 and the transfer destination table T2 held therein, and transfers the frame to the autonomous driving device 151F. Also, the switch device 151A receives the frame transmitted from the terminal device 101, refers to the destination address contained in the received frame as well as the VLAN table T1 and the transfer destination table T2 held therein, and transfers the frame to the autonomous driving device 151F.

The autonomous driving device 151F receives each of the frames transferred from the switch device 151A, and performs control over autonomous driving of the vehicle 1 on the basis of the result of detection contained in each of the frames.

As described above, the autonomous driving device 151F acquires the result of detection based on image analysis performed by the program held by the terminal device 101. This makes it possible to acquire more detailed results of detection that may not be obtained through image analysis performed by the image analysis device 151E. It is thus possible to achieve more precise control over autonomous driving.

In the example described above, the in-vehicle device 151 that communicates with the terminal device 101 is the switch device 151A that relays data between the other in-vehicle devices 151. However, the configuration is not limited to this. For example, the in-vehicle device 151 that communicates with the terminal device 101 may be a type of device different from the switch device.

The terminal device 101 may determine the virtual configuration in such a way that image analysis is performed, for example, on all captured images acquired by the right-side camera 151B, the front camera 151C, and the left-side camera 151D.

In this case, for example, the terminal device 101 receives a frame containing image data transmitted from each of the right-side camera 151B, the front camera 151C, and the left-side camera 151D through the switch device 151A, and performs image analysis on the basis of the image data contained in each of the received frames to detect an object around the vehicle 1. The terminal device 101 then generates a frame containing the result of detection, and transmits the generated frame through the switch device 151A to the autonomous driving device 151F.

[Flow of Operations]

Each device in the vehicle virtualization system 201 includes a computer. A computing unit, such as a CPU, of the computer reads a program including some or all steps in a sequence diagram and a flowchart (described below) from a memory (not shown) and executes the read program. The programs of the plurality of devices may be installed from external sources. The programs of the plurality of devices are stored in and distributed as recording media.

Figure 7:
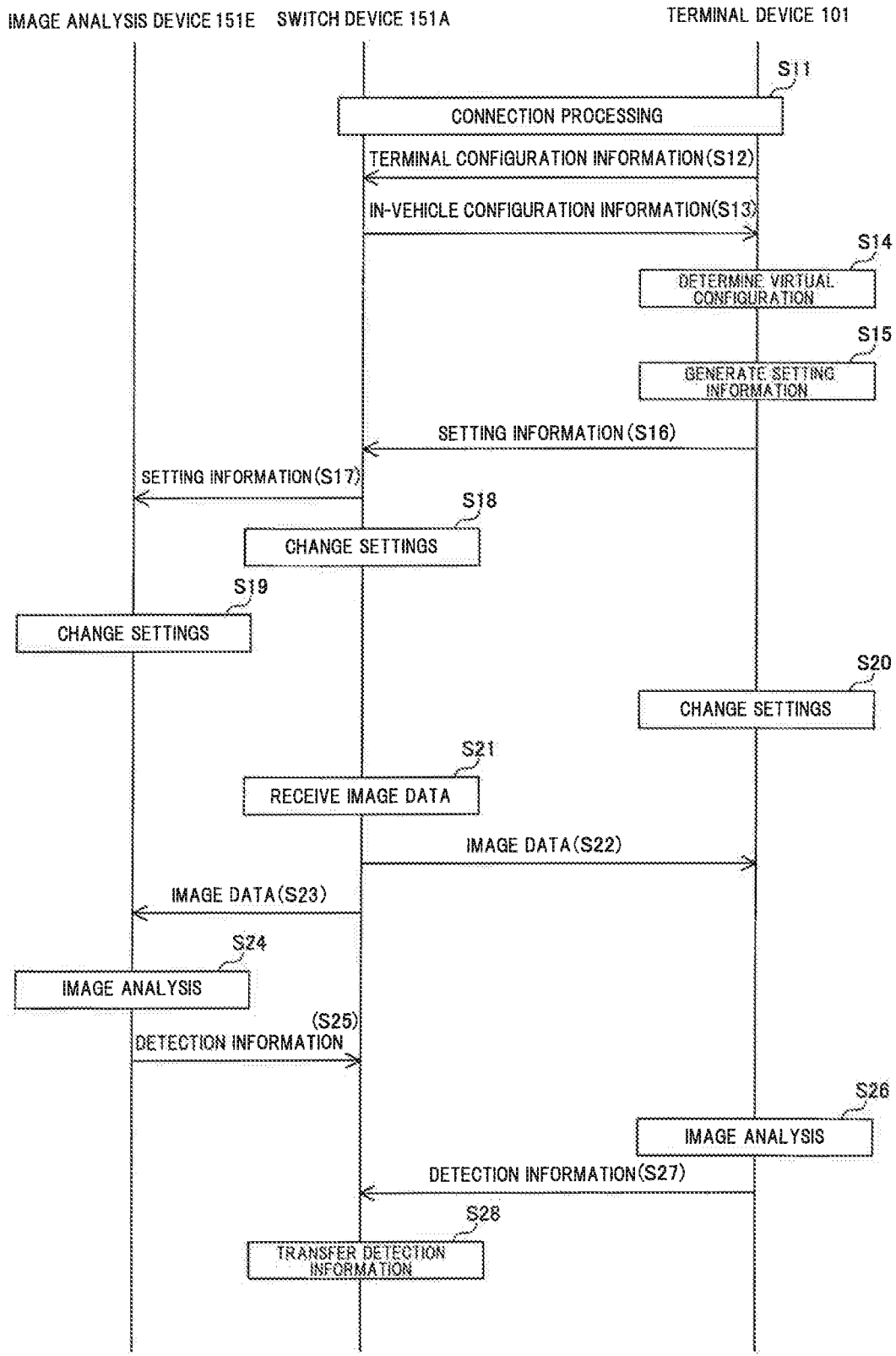
FIG. 7 is a sequence diagram illustrating an exemplary flow of operations performed by the in-vehicle devices and the terminal device in the vehicle virtualization system according to the first embodiment of the present invention.

FIG. 7 is a sequence diagram illustrating an exemplary flow of operations performed by the in-vehicle devices and the terminal device in the vehicle virtualization system according to the first embodiment of the present invention. A flow of operations performed by the switch device 151A, the image analysis device 151E, and the terminal device 101 illustrated in FIG. 2 and FIG. 5 will be described here. Note that the switch device 151A, the image analysis device 151E, and the terminal device 101 are all in the ON-state.

Referring to FIG. 2, FIG. 5, and FIG. 7, when the terminal device 101 is brought into the vehicle 1, the switch device 151A and the terminal device 101 first perform connection processing for establishing a communication connection (step S11).

Next, the terminal device 101 transmits terminal configuration information held therein to the switch device 151A (step S12).

Next, the switch device 151A acquires five pieces of in-vehicle configuration information held in the respective in-vehicle devices 151B to 151F, and transmits the acquired five pieces of in-vehicle configuration information and in-vehicle configuration information held in the switch device 151A to the terminal device 101 (step S13). The transmission of the terminal configuration information from the terminal device 101 (step S12) may take place after transmission of the in-vehicle configuration information from the switch device 151A (step S13).

Next, the terminal device 101 determines a virtual configuration, on the basis of the six pieces of in-vehicle configuration information received from the switch device 151A as well as the processing information and the terminal configuration information held in the terminal device 101 (step S14).

Next, the terminal device 101 generates, for example, setting information corresponding to each of the switch device 151A, the image analysis device 151E, and the terminal device 101 for implementing the determined virtual configuration (step S15).

Next, the terminal device 101 transmits, to the switch device 151A, the generated setting information corresponding to the switch device 151A and the generated setting information corresponding to the image analysis device 151E (step S16).

Next, the switch device 151A transfers, to the image analysis device 151E, one of the two pieces of setting information received from the terminal device 101, or specifically, the setting information corresponding to the image analysis device 151E (step S17).

Next, the switch device 151A changes settings thereof on the basis of the other of the two pieces of setting information received from the terminal device 101, or specifically, on the basis of the setting information corresponding to the switch device 151A (step S18).

Next, the image analysis device 151E changes settings thereof on the basis of the setting information received from the switch device 151A (step S19).

Next, the terminal device 101 changes settings thereof on the basis of the generated setting information corresponding to the terminal device 101 (step S20).

The transfer of the setting information from the switch device 151A (step S17), the change of settings of the switch device 151A (step S18), the change of settings of the image analysis device 151E (step S19), and the change of settings of the terminal device 101 (step S20) may take place in any order.

Next, the switch device 151A receives image data transmitted from each of the right-side camera 151B, the front camera 151C, and the left-side camera 151D (step S21).

Next, the switch device 151A transmits the image data received from the front camera 151C to the terminal device 101 (step S22).

Next, the switch device 151A transmits the image data received from each of the right-side camera 151B and the left-side camera 151D to the image analysis device 151E (step S23).

Next, the image analysis device 151E performs image analysis on the basis of each image data received from the switch device 151A to detect an object around the vehicle 1 (step S24), and transmits detection information representing the result of detection to the switch device 151A (step S25).

Next, the terminal device 101 performs image analysis on captured images on the basis of the image data received from the switch device 151A to detect an object around the vehicle 1 (step S26), and transmits detection information representing the result of detection to the switch device 151A (step S27).

Next, the switch device 151A transfers the detection information received from the terminal device 101, as well as the detection information received from the image analysis device 151E, to the autonomous driving device 151F (step S28). The autonomous driving device 151F then performs control over autonomous driving of the vehicle 1 on the basis of the plurality of pieces of detection information received from the switch device 151A.

Since the terminal device 101 determines the virtual configuration (step S14), the terminal device 101 does not necessarily need to transmit the terminal configuration information to the switch device 151A (step S12).

[Application 2 of Vehicle Virtualization System]

The in-vehicle device 151 may change settings thereof on the basis of setting information from the terminal device 101 in such a way that the in-vehicle device 151 performs a new type of function.

More specifically, the terminal device 101 holds a program for performing a function corresponding to a service provided to the user. For example, the terminal device 101 holds a plurality of types of programs for using the vehicle 1 as a mobile restaurant.

In this case, the determination unit 25 of the terminal device 101 determines a virtual configuration in such a way that at least some of the plurality of types of programs are executed by the in-vehicle device 151, and transmits setting information for implementing the determined virtual configuration through the communication unit 21 to the in-vehicle device 151. The setting information includes some of the plurality of types of programs held by the terminal device 101.

The setting unit 13 of the in-vehicle device 151 receives, through the communication unit 11, the setting information transmitted from the terminal device 101. On the basis of the setting information, the setting unit 13 performs setting on the in-vehicle device 151, for example, for receiving orders from a restaurant's menu on a monitor in the vehicle 1.

In accordance with settings made by the setting unit 13, for example, the function unit 14 of the in-vehicle device 151 performs control for displaying the restaurant's menu on the monitor in the vehicle 1, or performs processing for transmitting a menu item selected on the monitor by the user through the communication unit 11 to the terminal device 101.

[Application 3 of Vehicle Virtualization System]

The terminal device 101 may be attached to, for example, equipment used to provide services. Specifically, the terminal device 101 holds a plurality of types of programs for using the vehicle 1 as a mobile hotel, and is attached to a bed used in the mobile hotel.

In this case, for example, when the bed is brought into the vehicle 1, the determination unit 25 of the terminal device 101 determines a virtual configuration in such a way that at least some of the plurality of types of programs are executed by the in-vehicle device 151, and transmits setting information for implementing the determined virtual configuration through the communication unit 21 to the in-vehicle device 151.

The setting unit 13 of the in-vehicle device 151 receives, through the communication unit 11, the setting information transmitted from the terminal device 101, and changes settings of the in-vehicle device 151 on the basis of the setting information. The function unit 14 of the in-vehicle device 151 thus controls driving of the vehicle 1, for example, so as to reduce hard braking and sudden acceleration of the vehicle 1.

The vehicle control system according to Patent Literature 1 and the vehicle network control device according to Patent Literature 2 are designed to adjust a predetermined function of an in-vehicle device or a device brought into the vehicle, and are not capable of adjusting other functions. There has been a desire for better techniques that can flexibly and easily improve services provided in the vehicle.

Applying a virtualization technique to an in-vehicle device may improve services provided in the vehicle through more effective use of various resources in the vehicle. However, conventionally, the in-vehicle device has not been equipped with sophisticated hardware or software. Also, since CAN communication or local interconnect network (LIN) communication has been mainly used in the in-vehicle network, it has been difficult to apply a virtualization technique to the in-vehicle device.

In the vehicle virtualization system 201 according to the first embodiment of the present invention, the determination unit 25 of the terminal device 101 acquires terminal configuration information about a hardware configuration of the terminal device 101, and in-vehicle configuration information about a hardware configuration of the in-vehicle device 151. On the basis of the acquired terminal configuration information and the acquired in-vehicle configuration information, the determination unit 25 determines a virtual configuration of the terminal device 101 and the in-vehicle device 151 for performing predetermined processing. The determination unit 25 generates setting information for implementing the determined virtual configuration and transmits the setting information to the in-vehicle device 151. The setting unit 23 changes settings of the terminal device 101 on the basis of the setting information generated by the determination unit 25. The in-vehicle device 151 changes settings thereof on the basis of the setting information received from the determination unit 25.

As described above, the terminal device 101 determines the virtual configuration required for predetermined processing on the basis of information about the hardware configuration of the in-vehicle device 151, and then the settings of the in-vehicle device 151 as well as the settings of the terminal device 101 are changed to implement the virtual configuration. The user can thus receive desired services in various vehicles 1 by bringing the terminal device 101 into the vehicles 1. For example, without adding too many capabilities to the in-vehicle device 151, services in the vehicle 1 can be improved at low cost, as the performance of the terminal device 101 improves.

The vehicle virtualization system 201 according to the first embodiment of the present invention can thus flexibly and easily improve services provided in the vehicle 1.

In the vehicle virtualization system 201 according to the first embodiment of the present invention, the terminal device 101 includes the storage unit 22 that stores processing information about predetermined processing. The determination unit 25 of the terminal device 101 determines a virtual configuration on the basis of the processing information stored in the storage unit 22.

For example, this configuration allows the in-vehicle device 151 to execute a program involving predetermined processing and held in the terminal device 101 and extends the functionality of the in-vehicle device 151, or allows the terminal device 101 to execute the program and provide services that cannot be provided by the in-vehicle device 151.

In the vehicle virtualization system 201 according to the first embodiment of the present invention, the processing information represents a correspondence between the predetermined processing and resources required for the predetermined processing. The terminal device 101 updates the processing information with new processing information acquired from a network.

This configuration makes it possible to acquire the latest processing information and change the predetermined processing performed by the in-vehicle device 151 or the terminal device 101.

In the terminal device 101 according to the first embodiment of the present invention, the communication unit 21 acquires in-vehicle configuration information about a hardware configuration of the in-vehicle device 151. On the basis of the in-vehicle configuration information acquired by the communication unit 21 as well as terminal configuration information about a hardware configuration of the terminal device 101, the determination unit 25 determines a virtual configuration of the terminal device 101 and the in-vehicle device 151 for performing predetermined processing, and generates setting information for implementing the determined virtual configuration. The communication unit 21 transmits the setting information generated by the determination unit 25 to the in-vehicle device 151. The setting unit 23 changes settings of the terminal device 101 to be appropriate for the virtual configuration determined by the determination unit 25.

As described above, the terminal device 101 determines the virtual configuration required for predetermined processing on the basis of information about the hardware configuration of the in-vehicle device 151, and then the settings of the in-vehicle device 151 as well as the settings of the terminal device 101 are changed to implement the virtual configuration. The user can thus receive desired services in various vehicles 1 by bringing the terminal device 101 into the vehicles 1. For example, without adding too many capabilities to the in-vehicle device 151, services in the vehicle 1 can be improved at low cost, as the performance of the terminal device 101 improves.

The terminal device 101 according to the first embodiment of the present invention can thus flexibly and easily improve services provided in the vehicle 1.

In the in-vehicle device 151 according to the first embodiment of the present invention, the communication unit 11 transmits in-vehicle configuration information about a hardware configuration of the in-vehicle device 151. The communication unit 11 receives setting information for implementing a virtual configuration which is required for performing predetermined processing and determined on the basis of the transmitted in-vehicle configuration information. The setting unit 13 changes settings of the in-vehicle device 151 on the basis of the setting information received by the communication unit 11.

This configuration makes it possible to implement the virtual configuration determined on the basis of information about the hardware configuration of the in-vehicle device 151, and thus to allow the user to receive desired services in the vehicle 1. For example, without adding too many capabilities to the in-vehicle device 151, services in the vehicle 1 can be improved at low cost.

The in-vehicle device 151 according to the first embodiment of the present invention can thus flexibly and easily improve services provided in the vehicle 1.

In a virtualization method according to the first embodiment of the present invention, the determination unit 25 of the terminal device 101 first acquires terminal configuration information about a hardware configuration of the terminal device 101 and in-vehicle configuration information about a hardware configuration of the in-vehicle device 151. Next, on the basis of the acquired terminal configuration information and the acquired in-vehicle configuration information, the determination unit 25 determines a virtual configuration of the terminal device 101 and the in-vehicle device 151 for performing predetermined processing. Next, the determination unit 25 generates setting information for implementing the determined virtual configuration and transmits the setting information to the in-vehicle device 151. Next, the setting unit 23 changes settings of the terminal device 101 on the basis of the setting information generated by the determination unit 25, and the in-vehicle device 151 changes settings thereof on the basis of the setting information received from the determination unit 25.

As described above, the terminal device 101 determines the virtual configuration required for predetermined processing on the basis of information about the hardware configuration of the in-vehicle device 151, and then the settings of the in-vehicle device 151 as well as the settings of the terminal device 101 are changed to implement the virtual configuration. The user can thus receive desired services in various vehicles 1 by bringing the terminal device 101 into the vehicles 1. For example, without adding too many capabilities to the in-vehicle device 151, services in the vehicle 1 can be improved at low cost, as the performance of the terminal device 101 improves.

The virtualization method according to the first embodiment of the present invention can thus flexibly and easily improve services provided in the vehicle 1.

Also, in the virtualization method according to the first embodiment of the present invention, the communication unit 21 of the terminal device 101 acquires in-vehicle configuration information about a hardware configuration of the in-vehicle device 151. Next, on the basis of the in-vehicle configuration information acquired by the communication unit 21 as well as terminal configuration information about a hardware configuration of the terminal device 101, the determination unit 25 of the terminal device 101 determines a virtual configuration of the terminal device 101 and the in-vehicle device 151 for performing predetermined processing. Next, the determination unit 25 generates setting information for implementing the determined virtual configuration and transmits the setting information to the in-vehicle device 151. Next, the setting unit 23 changes settings of the terminal device 101 to be appropriate for the virtual configuration determined by the determination unit 25.

As described above, the terminal device 101 determines the virtual configuration required for predetermined processing on the basis of information about the hardware configuration of the in-vehicle device 151, and then the settings of the in-vehicle device 151 as well as the settings of the terminal device 101 are changed to implement the virtual configuration. The user can thus receive desired services in various vehicles 1 by bringing the terminal device 101 into the vehicles 1. For example, without adding too many capabilities to the in-vehicle device 151, services in the vehicle 1 can be improved at low cost, as the performance of the terminal device 101 improves.

The virtualization method according to the first embodiment of the present invention can thus flexibly and easily improve services provided in the vehicle 1.

Also, in the virtualization method according to the first embodiment of the present invention, the communication unit 11 of the in-vehicle device 151 transmits in-vehicle configuration information about a hardware configuration of the in-vehicle device 151. Next, the communication unit 11 receives setting information for implementing a virtual configuration which is required for performing predetermined processing and determined on the basis of the transmitted in-vehicle configuration information. Then, the setting unit 13 of the in-vehicle device 151 changes settings of the in-vehicle device 151 on the basis of the setting information received by the communication unit 11.

This method makes it possible to implement the virtual configuration determined on the basis of information about the hardware configuration of the in-vehicle device 151, and thus to allow the user to receive desired services in the vehicle 1. For example, without adding too many capabilities to the in-vehicle device 151, services in the vehicle 1 can be improved at low cost.

The virtualization method according to the first embodiment of the present invention can thus flexibly and easily improve services provided in the vehicle 1.

<Modification>

In the vehicle virtualization system 201 according to the first embodiment of the present invention described above, the determination unit 25 of the terminal device 101 determines the virtual configuration for performing predetermined processing and generates setting information.

In contrast, in the vehicle virtualization system 201 according to a modification of the first embodiment of the present invention, a determination unit 15 of the in-vehicle device 151, not the determination unit 25 of the terminal device 101, determines the virtual configuration for performing predetermined processing and generates setting information.

[Configuration and Basic Operations]

Figure 8:
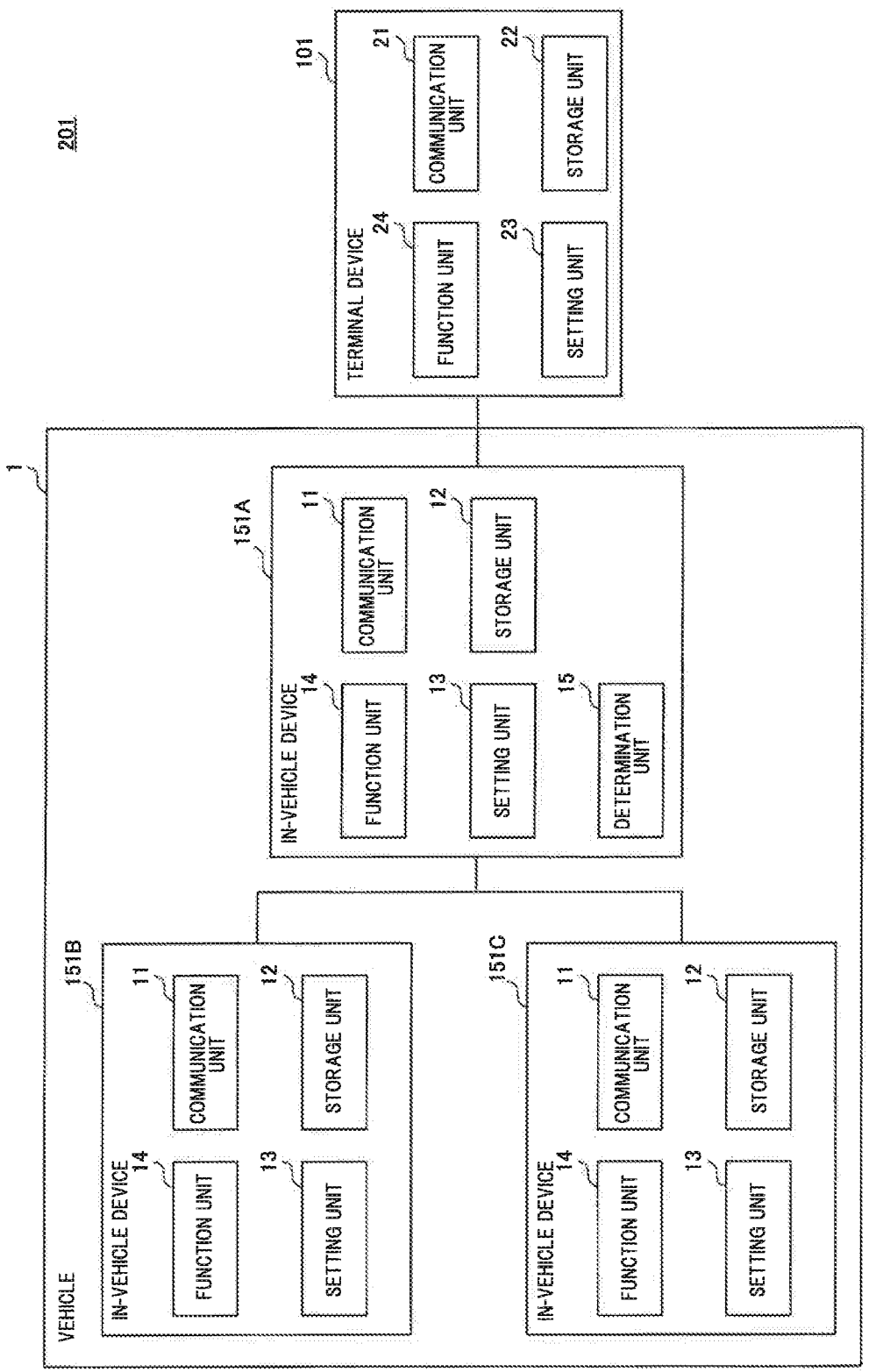
FIG. 8 is a diagram illustrating a configuration of a vehicle virtualization system according to a modification of the first embodiment of the present invention.

FIG. 8 is a diagram illustrating a configuration of a vehicle virtualization system according to a modification of the first embodiment of the present invention.

Referring to FIG. 8, unlike the in-vehicle device 151A according to the first embodiment illustrated in FIG. 1, the in-vehicle device 151A according to the modification of the first embodiment of the present invention includes the determination unit 15. Also, unlike the terminal device 101 according to the first embodiment illustrated in FIG. 1, a terminal device 101 according to the modification of the first embodiment of the present invention does not include the determination unit 25.

The communication unit 21 of the terminal device 101 transmits terminal configuration information and processing information stored in the storage unit 22 to the in-vehicle device 151A.

The communication unit 11 of the in-vehicle device 151A receives the terminal configuration information and the processing information transmitted from the terminal device 101, and outputs the terminal configuration information and the processing information to the determination unit 15.

The communication unit 11 of the in-vehicle device 151A acquires in-vehicle configuration information from each of the in-vehicle device 151B and the in-vehicle device 151C, and transmits the acquired in-vehicle configuration information and in-vehicle configuration information of the in-vehicle device 151A stored in the storage unit 12 to the terminal device 101.

The communication unit 21 of the terminal device 101 receives the plurality of pieces of in-vehicle configuration information transmitted from the in-vehicle device 151A and stores the plurality of pieces of in-vehicle configuration information as, for example, log information in the storage unit 22. The in-vehicle device 151A may be configured not to transmit the in-vehicle configuration information to the terminal device 101.

The determination unit 15 of the in-vehicle device 151A determines a virtual configuration on the basis of the terminal configuration information and processing information received from the communication unit 11, the two pieces of in-vehicle configuration information corresponding to the in-vehicle device 151B and the in-vehicle device 151C and acquired by the communication unit 11, and the in-vehicle configuration information of the in-vehicle device 151A stored in the storage unit 12. Then, the determination unit 15 generates one or more pieces of setting information for implementing the determined virtual configuration. Of the generated one or more pieces of setting information, the setting information corresponding to the terminal device 101 is transmitted from the determination unit 15 through the communication unit 11 to the terminal device 101.

The communication unit 21 of the terminal device 101 receives the setting information transmitted from the in-vehicle device 151A and outputs the received setting information to the setting unit 23. Upon receiving the setting information output from the communication unit 21, the setting unit 23 changes the settings of the terminal device 101 on the basis of the setting information.

When the determination unit 15 of the in-vehicle device 151A generates setting information corresponding to the in-vehicle device 151A, the determination unit 15 outputs the setting information to the setting unit 13. Upon receiving the setting information output from the determination unit 15, the setting unit 13 changes the settings of the in-vehicle device 151A on the basis of the setting information.

When the determination unit 15 of the in-vehicle device 151A generates setting information corresponding to at least one of the in-vehicle device 151B and the in-vehicle device 151C, the determination unit 15 transmits the generated setting information through the communication unit 11 to the corresponding in-vehicle device 151.

When setting information transmitted from the in-vehicle device 151A is received, the communication unit 11 of the in-vehicle device 151B outputs the setting information to the setting unit 13 of the in-vehicle device 151B, or the communication unit 11 of the in-vehicle device 151C outputs the setting information to the setting unit 13 of the in-vehicle device 151C. Upon receiving the setting information output from the communication unit 11, the setting unit 13 of the in-vehicle device 151B changes the settings of the in-vehicle device 151B on the basis of the received setting information, or the setting unit 13 of the in-vehicle device 151C changes the settings of the in-vehicle device 151C on the basis of the received setting information.

[Flow of Operations]

Figure 9:
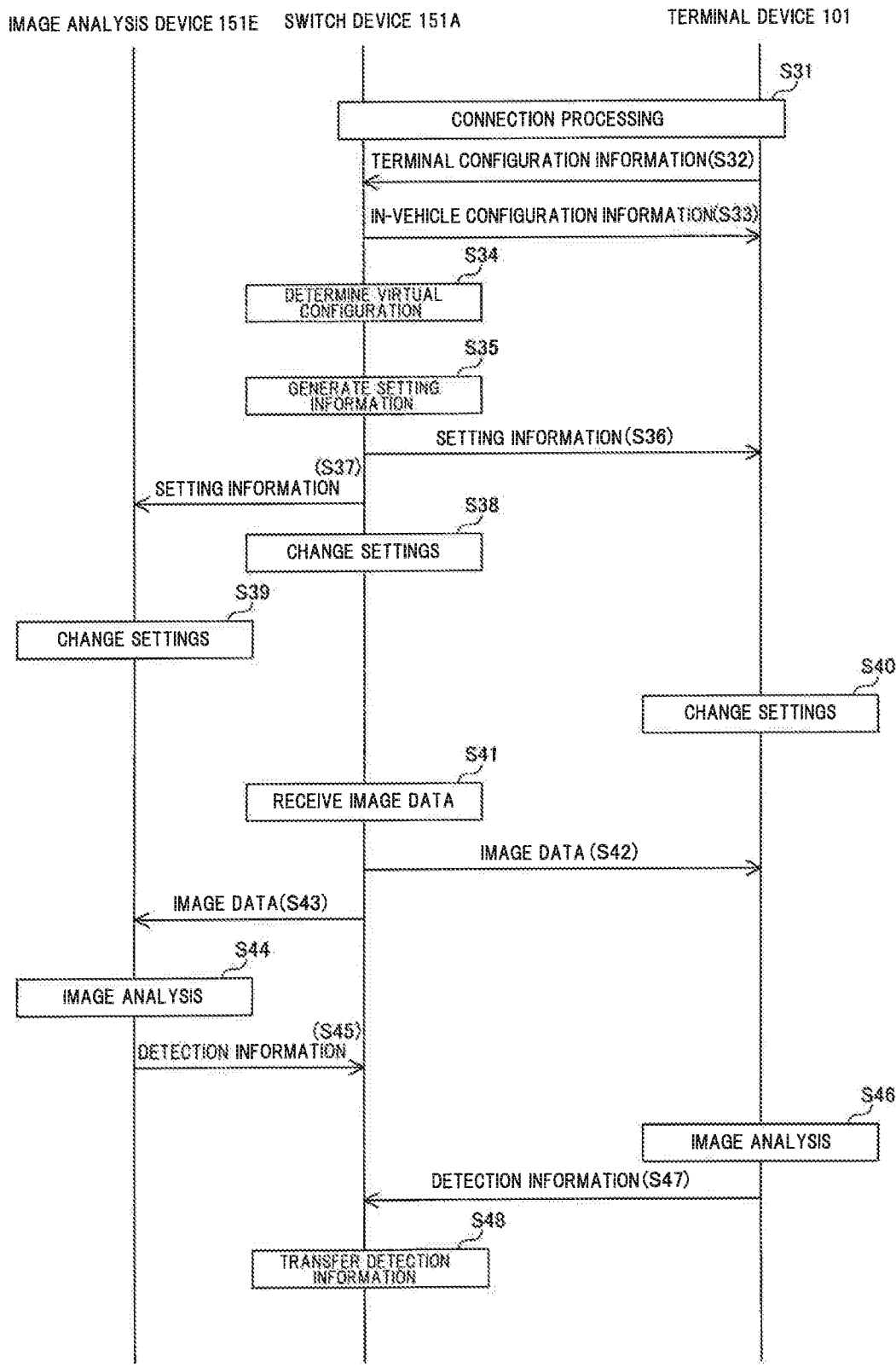
FIG. 9 is a sequence diagram illustrating an exemplary flow of operations performed by the in-vehicle devices and the terminal device in the vehicle virtualization system according to the modification of the first embodiment of the present invention.

FIG. 9 is a sequence diagram illustrating an exemplary flow of operations performed by the in-vehicle devices and the terminal device in the vehicle virtualization system according to the modification of the first embodiment of the present invention. A flow of operations performed by the switch device 151A, the image analysis device 151E, and the terminal device 101 illustrated in FIG. 2 and FIG. 5 will be described here. Note that the switch device 151A, the image analysis device 151E, and the terminal device 101 are all in the ON-state.

Referring to FIG. 2, FIG. 5, and FIG. 9, the operations in step S31 to step S33 illustrated in FIG. 9 are the same as the operations in step S11 to step S13 illustrated in FIG. 7, and their detailed description will not be repeated here.

The switch device 151A determines a virtual configuration on the basis of the acquired plurality of pieces of in-vehicle configuration information, the in-vehicle configuration information of the switch device 151A held therein, and the terminal configuration information received from the terminal device 101 (step S34).

Next, the switch device 151A generates, for example, setting information corresponding to each of the image analysis device 151E, the terminal device 101, and the switch device 151A for implementing the determined virtual configuration (step S35).

Next, the switch device 151A transmits the generated setting information corresponding to the terminal device 101 to the terminal device 101 (step S36).

Next, the switch device 151A transmits the generated setting information corresponding to the image analysis device 151E to the image analysis device 151E (step S37).

Next, the switch device 151A changes settings thereof on the basis of the generated setting information corresponding to the switch device 151A (step S38).

Next, the image analysis device 151E changes settings thereof on the basis of the setting information received from the switch device 151A (step S39).

Next, the terminal device 101 changes settings thereof on the basis of the setting information received from the switch device 151A (step S40).

The transmission of the setting information from the switch device 151A to the terminal device 101 (step S36) may take place after transmission of the setting information from the switch device 151A to the image analysis device 151E (step S37). Also, the change of settings of the switch device 151A (step S38), the change of settings of the image analysis device 151E (step S39), and the change of settings of the terminal device 101 (step S40) may take place in any order.

Since the switch device 151A determines the virtual configuration (step S34), the switch device 151A does not necessarily need to transmit the in-vehicle configuration information to the terminal device 101 (step S33).

The operations in step S41 to step S48 are the same as the operations in step S21 to step S28 illustrated in FIG. 7, and their detailed description will not be repeated here.

In the vehicle virtualization system 201 according to the modification of the first embodiment of the present invention, the determination unit 15 of the in-vehicle device 151 acquires terminal configuration information about a hardware configuration of the terminal device 101, and in-vehicle configuration information about a hardware configuration of the in-vehicle device 151. On the basis of the acquired terminal configuration information and the acquired in-vehicle configuration information, the determination unit 15 determines a virtual configuration of the terminal device 101 and the in-vehicle device 151 for performing predetermined processing. The determination unit 15 generates setting information for implementing the determined virtual configuration and transmits the generated setting information to the terminal device 101. The setting unit 13 changes settings of the in-vehicle device 151 on the basis of the setting information generated by the determination unit 15. The terminal device 101 changes settings thereof on the basis of the setting information received from the determination unit 15.

As described above, the in-vehicle device 151 determines the virtual configuration required for predetermined processing on the basis of information about the hardware configuration of the terminal device 101, and then the settings of the terminal device 101 as well as the settings of the in-vehicle device 151 are changed to implement the virtual configuration. The user can thus receive desired services in various vehicles 1 by bringing the terminal device 101 into the vehicles 1. For example, without adding too many capabilities to the in-vehicle device 151, services in the vehicle 1 can be improved at low cost, as the performance of the terminal device 101 improves.

The vehicle virtualization system 201 according to the modification of the first embodiment of the present invention can thus flexibly and easily improve services provided in the vehicle 1.

Other embodiments of the present invention will now be described with reference to the drawings. The same or corresponding parts in the drawings are assigned the same reference numerals and their description will not be repeated.

Second Embodiment

In the first embodiment of the present invention described above, the terminal device 101 determines the virtual configuration on the basis of processing information held therein. In a second embodiment of the present invention, however, a terminal device 102 determines the virtual configuration on the basis of processing information held in the in-vehicle device 152.

[Configuration and Basic Operations]

Figure 10:
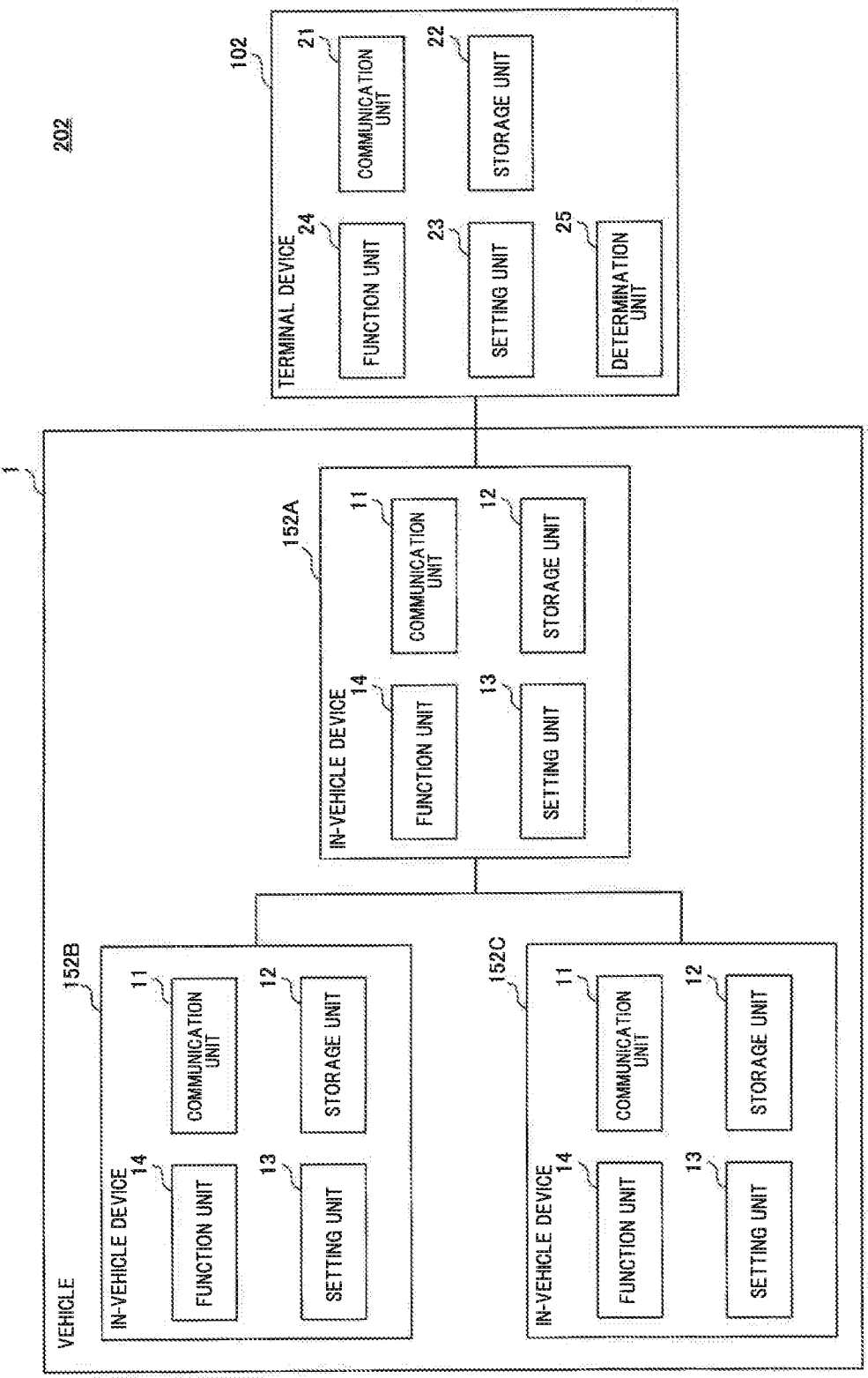
FIG. 10 is a diagram illustrating a configuration of a vehicle virtualization system according to a second embodiment of the present invention.

FIG. 10 is a diagram illustrating a configuration of a vehicle virtualization system according to the second embodiment of the present invention.

Referring to FIG. 10, a vehicle virtualization system 202 according to the second embodiment of the present invention includes the terminal device 102 and one or more in-vehicle devices 152 installed in the vehicle 1. FIG. 10 illustrates three in-vehicle devices 152A, 152B, and 152C as an example. Hereinafter, the three in-vehicle devices 152A, 152B, and 152C are each also referred to as "in-vehicle device 152".

Like the in-vehicle device 151 according to the first embodiment of the present invention, the in-vehicle device 152 includes the communication unit 11, the storage unit 12, the setting unit 13, and the function unit 14.

Like the terminal device 101 according to the first embodiment of the present invention, the terminal device 102 includes the communication unit 21, the storage unit 22, the setting unit 23, the function unit 24, and the determination unit 25.

The storage unit 12 of the in-vehicle device 152 stores in-vehicle configuration information about a hardware configuration of the in-vehicle device 152.

The storage unit 12 of at least one of the three in-vehicle devices 152A, 152B, and 152C stores processing information about predetermined processing, as well as the in-vehicle configuration information.

The communication unit 11 of the in-vehicle device 152A acquires two pieces of in-vehicle configuration information stored in the in-vehicle device 152B and the in-vehicle device 152C from the in-vehicle device 152B and the in-vehicle device 152C. The communication unit 11 then transmits, to the terminal device 102, the acquired two pieces of in-vehicle configuration information as well as in-vehicle configuration information stored in the storage unit 12 of the in-vehicle device 152A.

The communication unit 11 also transmits, to the terminal device 102, one or more pieces of processing information stored in at least one of the three in-vehicle devices 152A, 152B, and 152C.

The communication unit 21 of the terminal device 102 receives the plurality of pieces of in-vehicle configuration information and one or more pieces of processing information transmitted from the in-vehicle device 152A, and outputs the received plurality of pieces of in-vehicle configuration information and the received one or more pieces of processing information to the determination unit 25.

The determination unit 25 determines a virtual configuration of the terminal device 102 and the plurality of in-vehicle devices 152, on the basis of the plurality of pieces of in-vehicle configuration information and the one or more pieces of processing information received from the communication unit 21, as well as terminal configuration information stored in the storage unit 22.

The determination unit 25 generates setting information for implementing the determined virtual configuration. The determination unit 25 may generate setting information for each of the in-vehicle devices 152A, 152B, and 152C and the terminal device 102, or may generate one or more pieces of setting information corresponding to one or more of the in-vehicle devices 152A, 152B, and 152C and the terminal device 102. The determination unit 25 transmits the generated one or more pieces of setting information through the communication unit 21 to the in-vehicle device 152A. At the same time, the determination unit 25 outputs the generated setting information corresponding to the terminal device 102 to the setting unit 23.

Upon receiving the setting information output from the determination unit 25, the setting unit 23 changes, on the basis of the setting information, the settings of the terminal device 102 to be appropriate for the determined virtual configuration.

The communication unit 11 of the in-vehicle device 152A receives the one or more pieces of setting information transmitted from the terminal device 102. When setting information corresponding to the in-vehicle device 152A is received, the communication unit 11 outputs the setting information to the setting unit 13.

Upon receiving the setting information output from the communication unit 11, the setting unit 13 changes the setting of the in-vehicle device 152A on the basis of the setting information.

The function unit 14 of the in-vehicle device 152A provides a virtualization function in accordance with the settings made by the setting unit 13.

When setting information corresponding to the in-vehicle device 152B or the in-vehicle device 152C is received, the communication unit 11 of the in-vehicle device 152A transfers the setting information to the in-vehicle device 152B or the in-vehicle device 152C.

When setting information transmitted from the in-vehicle device 152A is received, the communication unit 11 of the in-vehicle device 152B outputs the setting information to the setting unit 13 of the in-vehicle device 152B, or the communication unit 11 of the in-vehicle device 152C outputs the setting information to the setting unit 13 of the in-vehicle device 152C. Upon receiving the setting information output from the communication unit 11, the setting unit 13 of the in-vehicle device 152B changes the settings of the in-vehicle device 152B on the basis of the received setting information, or the setting unit 13 of the in-vehicle device 152C changes the settings of the in-vehicle device 152C on the basis of the received setting information.

The function unit 24 of the terminal device 102 provides a virtualization function in accordance with the settings made by the setting unit 23.

[Application of Vehicle Virtualization System]

This section deals with an example where the terminal device 102 determines a virtual configuration in such a way that some of a plurality of types of programs held by the in-vehicle device 152 is executed by the terminal device 102.

(Before Setting Change)

Figure 11:
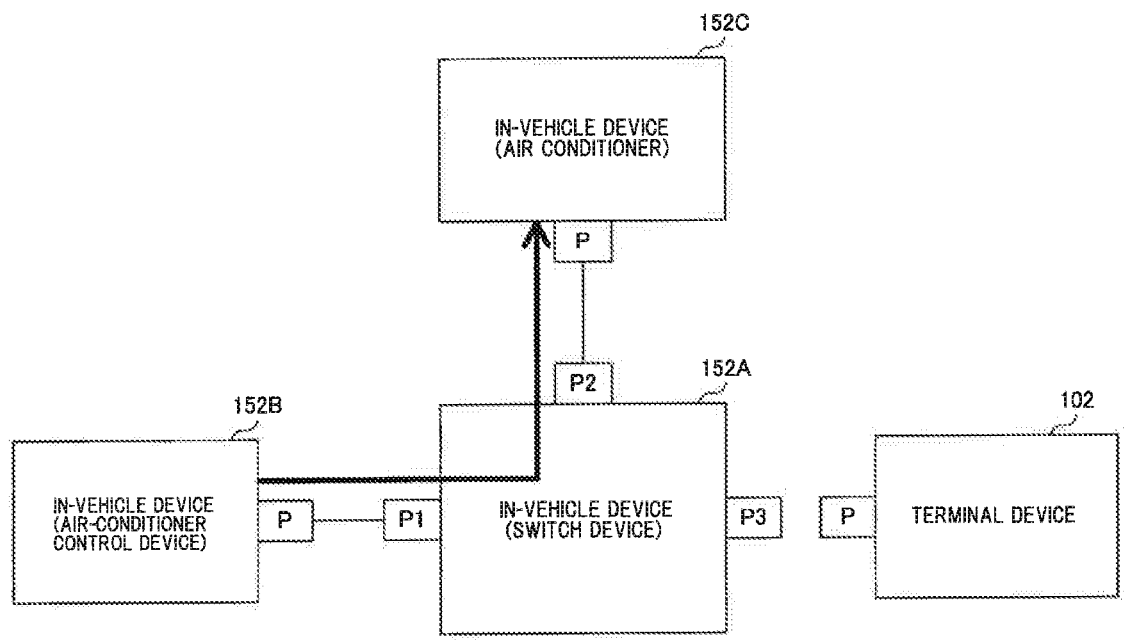
FIG. 11 is a diagram illustrating an application of the vehicle virtualization system according to the second embodiment of the present invention, specifically illustrating a state before settings of the in-vehicle devices and the terminal device are changed.

FIG. 11 is a diagram illustrating an application of the vehicle virtualization system according to the second embodiment of the present invention, specifically illustrating a state before settings of the in-vehicle devices and the terminal device are changed.

Referring to FIG. 11, the vehicle 1 is equipped with three in-vehicle devices 152A, 152B, and 152C. The in-vehicle device 152A communicates with the terminal device 102. Also, the in-vehicle device 152A relays data transmitted and received between the in-vehicle devices 152B and 152C. The in-vehicle device 152A is also referred to as "switch device 152A" here.

The in-vehicle device 152C is an air conditioner installed in the vehicle 1. The in-vehicle device 152C is also referred to as "air conditioner 152C" here.

The in-vehicle device 152B is a human machine interface (HMI) for controlling the air conditioner 152C. The in-vehicle device 152B is also referred to as "air-conditioner control device 152B" here. The air-conditioner control device 152B receives an operation for the air conditioner 152C from the user and generates control information for the air conditioner 152C on the basis of the operation. The air-conditioner control device 152B transmits the generated control information through the switch device 152A to the air conditioner 152C.

The air conditioner 152C receives, through the switch device 152A, the control information transmitted from the air-conditioner control device 152B and operates in accordance with the received control information.

(After Setting Change)

Figure 12:
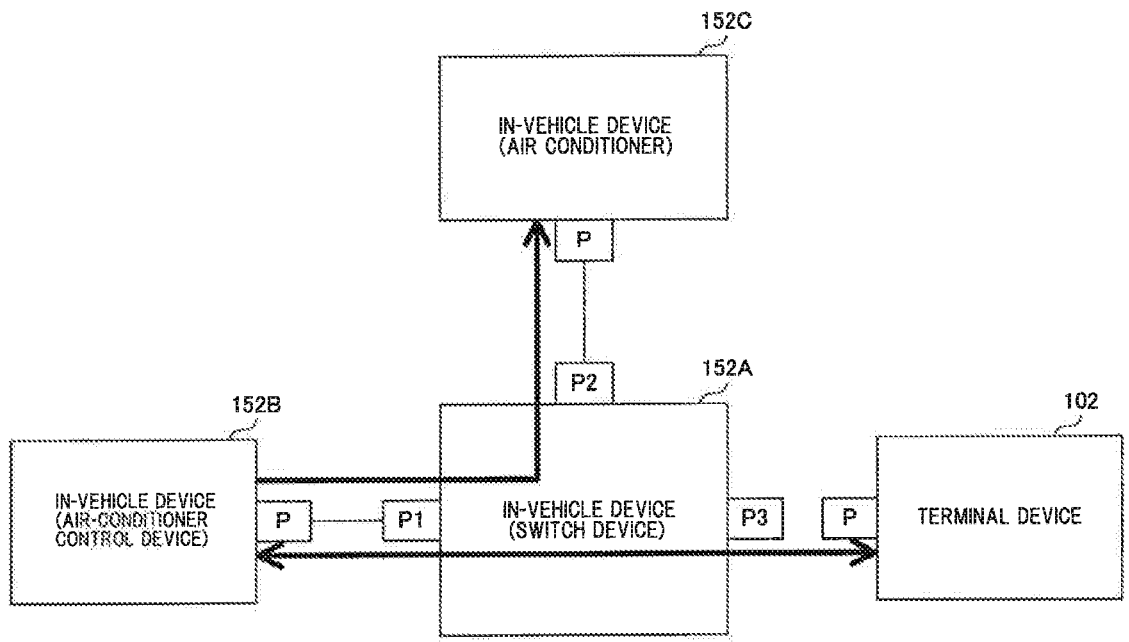
FIG. 12 is a diagram illustrating an application of the vehicle virtualization system according to the second embodiment of the present invention, specifically illustrating a state after settings of the in-vehicle devices and the terminal device are changed.

FIG. 12 is a diagram illustrating an application of the vehicle virtualization system according to the second embodiment of the present invention, specifically illustrating a state after settings of the in-vehicle devices and the terminal device are changed.

Referring to FIG. 12, when the terminal device 102 is brought into the vehicle 1, the terminal device 102 performs processing for establishing a communication connection with the switch device 152A.

When the communication connection with the terminal device 102 is established, the switch device 152A acquires, for example, in-vehicle configuration information from the air-conditioner control device 152B. The switch device 152A then transmits the in-vehicle configuration information acquired from the air-conditioner control device 152B and in-vehicle configuration information held in the switch device 152A to the terminal device 102.

The terminal device 102 transmits, for example, terminal configuration information held therein to the switch device 152A. The communication unit 11 of the in-vehicle device 152A receives the terminal configuration information transmitted from the terminal device 102 and stores the terminal configuration information as, for example, log information in the storage unit 12. The terminal device 102 may be configured not to transmit the terminal configuration information to the switch device 152A.

The terminal device 102 receives a plurality of pieces of in-vehicle configuration information and processing information transmitted from the switch device 152A, and determines a virtual configuration of the terminal device 102 and the plurality of in-vehicle devices 152 on the basis of the received plurality of pieces of in-vehicle configuration information and processing information, as well as terminal configuration information held by the terminal device 102.

For example, the terminal device 102 determines the virtual configuration in such a way that the terminal device 102 functions as a user interface that receives an operation for the air conditioner 152C from the user, and changes settings of the terminal device 102 to be appropriate for the determined virtual configuration.

As setting information for implementing the determined virtual configuration, the terminal device 102 generates setting information corresponding to each of the switch device 151A, the air-conditioner control device 152B, and the terminal device 102. The terminal device 102 then transmits the setting information corresponding to each of the switch device 152A and the air-conditioner control device 152B to the switch device 152A.

The setting unit 13 of the switch device 152A receives the two pieces of setting information from the terminal device 102 through the communication unit 11. On the basis of one of the two pieces of setting information received, that is, on the basis of the setting information corresponding to the switch device 152A, the setting unit 13 of the switch device 152A changes settings of the switch device 152A.

The communication unit 11 of the switch device 152A transfers the other of the two pieces of setting information received from the terminal device 102 to the air-conditioner control device 152B. That is, the communication unit 11 of the switch device 152A transfers the setting information corresponding to air-conditioner control device 152B to the air-conditioner control device 152B.

The setting unit 13 of the air-conditioner control device 152B receives the setting information transmitted from the switch device 152A through the communication unit 11, and changes settings of the air-conditioner control device 152B on the basis of the received setting information.

In accordance with settings made by the setting unit 23 of the terminal device 102, the function unit 24 receives, for example, an operation for the air conditioner 152C entered by the user on the screen of the terminal device 102 and transmits operation information representing the operation to the switch device 152A.

In accordance with settings made by the setting unit 13 of the switch device 152A, the function unit 14 transmits, for example, the operation information received from the terminal device 102 to the air-conditioner control device 152B.

The air-conditioner control device 152B receives the operation information transmitted from the switch device 152A and generates control information for the air conditioner 152C on the basis of the operation represented by the operation information. The air-conditioner control device 152B transmits the generated control information through the switch device 152A to the air conditioner 152C.

The air conditioner 152C receives the control information transmitted from the air-conditioner control device 152B through the switch device 152A and operates in accordance with the received control information.

[Flow of Operations]

Figure 13:
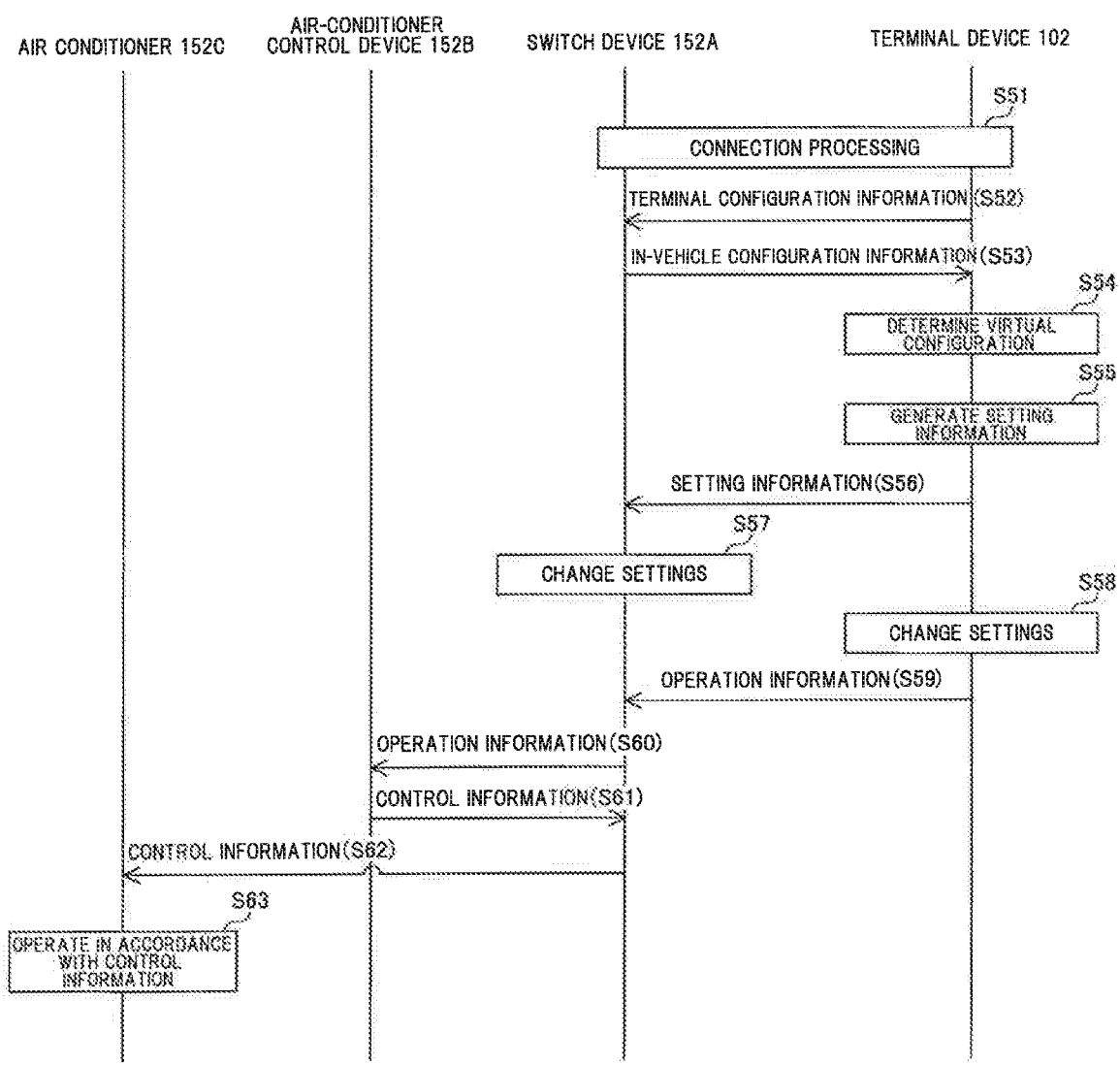
FIG. 13 is a sequence diagram illustrating an exemplary flow of operations performed by the in-vehicle devices and the terminal device in the vehicle virtualization system according to the second embodiment of the present invention.

FIG. 13 is a sequence diagram illustrating an exemplary flow of operations performed by the in-vehicle devices and the terminal device in the vehicle virtualization system according to the second embodiment of the present invention. A flow of operations performed by the switch device 152A, the air-conditioner control device 152B, the air conditioner 152C, and the terminal device 102 illustrated in FIG. 11 and FIG. 12 will be described here. Note that the switch device 152A, the air-conditioner control device 152B, the air conditioner 152C, and the terminal device 102 are all in the ON-state.

Referring to FIG. 13, when the terminal device 102 is brought into the vehicle 1, the switch device 152A and the terminal device 102 first perform connection processing for establishing a communication connection (step S51).

Next, the terminal device 102 transmits terminal configuration information held therein to the switch device 152A (step S52).

Next, the switch device 152A transmits, for example, in-vehicle configuration information held in the air-conditioner control device 152B, as well as in-vehicle configuration information and processing information held in the switch device 152A, to the terminal device 102 (step S53). The transmission of the terminal configuration information from the terminal device 102 (step S52) may take place after transmission of the in-vehicle configuration information and processing information from the switch device 152A (step S53).

Next, the terminal device 102 determines a virtual configuration on the basis of the in-vehicle configuration information and processing information received from the switch device 152A and the terminal configuration information held in the terminal device 102 (step S54).

Next, the terminal device 102 generates, for example, setting information corresponding to each of the switch device 152A and the terminal device 102 for implementing the determined virtual configuration (step S55).

Next, the terminal device 102 transmits the setting information corresponding to the switch device 152A to the switch device 152A (step S56).

Next, the switch device 152A changes settings thereof on the basis of the setting information received from the terminal device 102 (step S57).

Next, the terminal device 102 changes settings thereof on the basis of the setting information corresponding to the terminal device 102 (step S58).

Next, the terminal device 102 receives, for example, an operation for the air conditioner 152C entered by the user on the screen of the terminal device 102 and transmits operation information representing the operation to the switch device 152A (step S59).

Next, the switch device 152A transmits the operation information received from the terminal device 102 to the air-conditioner control device 152B (step S60).

Next, the air-conditioner control device 152B receives the operation information transmitted from the switch device 152A and generates control information for the air conditioner 152C on the basis of the operation represented by the operation information. The air-conditioner control device 152B transmits the generated control information to the switch device 152A (step S61).

Next, the switch device 152A receives the control information transmitted from the air-conditioner control device 152B and transmits the control information to the air conditioner 152C (step S62).

Next, the air conditioner 152C receives the control information transmitted from the switch device 152A and operates in accordance with the control information (step S63).

Since the terminal device 102 determines the virtual configuration (step S54), the terminal device 102 does not necessarily need to transmit the terminal configuration information (step S52).

As described above, in the vehicle virtualization system 202 according to the second embodiment of the present invention, the in-vehicle device 152 includes the storage unit 12 configured to store processing information about predetermined processing, and transmits the processing information stored in the storage unit 12 to the determination unit 25 of the terminal device 102. The determination unit 25 of the terminal device 102 determines a virtual configuration on the basis of the processing information received from the in-vehicle device 152.

For example, this configuration allows the terminal device 102 to execute a program involving predetermined processing and held in the in-vehicle device 152, and allows effective use of resources in the terminal device 102.

Note that some or all of the functions of the terminal device 101 according to the first embodiment of the present invention, some or all of the functions of the in-vehicle device 151 according to the modification of the first embodiment of the present invention, or some or all of the functions of the terminal device 102 according to the second embodiment of the present invention, may be provided by cloud computing.

The other configurations and operations are the same as those of the vehicle virtualization system 201 according to the first embodiment of the present invention, and their detailed description will not be repeated here.

Some or all of the components and operations of the devices according to the first embodiment, the modification of the first embodiment, and the second embodiment of the present invention may be combined where appropriate.

The embodiments disclosed herein should be considered illustrative, not restrictive, in all aspects. The scope of the present invention is defined by the appended claims, not by the explanation described above. All changes made within the appended claims and meanings and scopes equivalent thereto are intended to be embraced by the present invention.

The explanation described above includes features described in the following appendices.

[Appendix 1]

A vehicle virtualization system includes a terminal device, one or more in-vehicle devices, and a determination unit. The determination unit acquires terminal configuration information about a hardware configuration of the terminal device, and in-vehicle configuration information about a hardware configuration of the in-vehicle device. The determination unit determines a virtual configuration of the terminal device and the in-vehicle device on the basis of the acquired terminal configuration information and the acquired in-vehicle configuration information. The virtual configuration is for performing predetermined processing and uses resources of the terminal device and resources of the in-vehicle device. The determination unit generates setting information for implementing the determined virtual configuration and transmits the setting information to the terminal device and the in-vehicle device. The terminal device and the in-vehicle device each change settings thereof on the basis of the setting information received from the determination unit. The determination unit is included in the terminal device or the in-vehicle device.

[Appendix 2]

A terminal device includes an acquisition unit, a determination unit, a communication unit, and a setting unit. The acquisition unit acquires in-vehicle configuration information about a hardware configuration of an in-vehicle device. The determination unit determines a virtual configuration of the terminal device and the in-vehicle device on the basis of the in-vehicle configuration information acquired by the acquisition unit and terminal configuration information about a hardware configuration of the terminal device. The virtual configuration is for performing predetermined processing and uses resources of the terminal device and resources of the in-vehicle device. The determination unit generates setting information for implementing the determined virtual configuration. The communication unit transmits the setting information generated by the determination unit to the in-vehicle device. The setting unit changes settings of the terminal device to be appropriate for the virtual configuration determined by the determination unit. When the terminal device is brought into a vehicle equipped with the in-vehicle device, the acquisition unit acquires the in-vehicle configuration information.

[Appendix 3]

An in-vehicle device includes a transmission unit, a receiving unit, and a setting unit. The transmission unit transmits in-vehicle configuration information about a hardware configuration of the in-vehicle device. The receiving unit receives setting information for implementing a virtual configuration determined on the basis of the in-vehicle configuration information transmitted by the transmission unit. The virtual configuration is for performing predetermined processing and uses resources of the in-vehicle device. The setting unit changes settings of the in-vehicle device on the basis of the setting information received by the receiving unit. The in-vehicle device is an in-vehicle device installed in a vehicle used for carsharing or mobility-as-a-service (MaaS).

REFERENCE SIGNS LIST

1: vehicle
11: communication unit (transmission unit and receiving unit)
12, 22: storage unit
13, 23: setting unit
14, 24 function unit
15, 25: determination unit
21: communication unit (acquisition unit)
101, 102: terminal device
151, 151A to 151F, 152, 152A to 152C: in-vehicle device
201, 202: vehicle virtualization system

The invention claimed is:

1. A vehicle virtualization system comprising:
a terminal device;
one or more in-vehicle devices; and
a determination circuit,
wherein the determination circuit acquires terminal configuration information about a hardware configuration of the terminal device and in-vehicle configuration information about a hardware configuration of the in-vehicle device;
the determination circuit determines a virtual configuration of the terminal device and the in-vehicle device on the basis of the acquired terminal configuration information and the acquired in-vehicle configuration information, the virtual configuration being required for performing predetermined processing;
the determination circuit generates setting information for implementing the determined virtual configuration and transmits the setting information to the terminal device and the in-vehicle device; and
the terminal device and the in-vehicle device each change settings thereof on the basis of the setting information received from the determination circuit.

2. The vehicle virtualization system according to claim 1, wherein the determination circuit is included in the terminal device;
the terminal device includes a storage circuit configured to store processing information about the predetermined processing; and
the determination circuit determines the virtual configuration on the basis of the processing information stored in the storage circuit.

3. The vehicle virtualization system according to claim 2, wherein the processing information represents a correspondence between the predetermined processing and information about resources required for the predetermined processing; and
the terminal device updates the processing information with new processing information acquired from a network.

4. The vehicle virtualization system according to claim 2, wherein the predetermined processing is processing for providing services that become available when the in-vehicle device operates in cooperation with the terminal device.

5. The vehicle virtualization system according to claim 1, wherein the determination circuit determines the virtual configuration in such a way as to cause the terminal device to process target data, instead of allowing the in-vehicle device to process the target data.

6. The vehicle virtualization system according to claim 1, wherein the determination circuit generates the setting information relating to vehicle driving control performed by the in-vehicle device.

7. The vehicle virtualization system according to claim 1, wherein the determination circuit is included in the terminal device;
the in-vehicle device includes a storage circuit configured to store processing information about the predetermined processing, and transmits the processing information stored in the storage circuit to the determination circuit; and
the determination circuit determines the virtual configuration on the basis of the processing information received from the in-vehicle device.

8. The vehicle virtualization system according to claim 7, wherein the determination circuit determines the virtual configuration in such a way that the terminal device functions as a user interface that receives a user's operation for a device in a vehicle.

9. A terminal device comprising:
an acquisition circuit configured to acquire in-vehicle configuration information about a hardware configuration of an in-vehicle device;
a determination circuit configured to determine a virtual configuration of the terminal device and the in-vehicle device on the basis of the in-vehicle configuration information acquired by the acquisition circuit and terminal configuration information about a hardware configuration of the terminal device, the virtual configuration being required for performing predetermined processing, the determination circuit being configured to generate setting information for implementing the determined virtual configuration;
a communication circuit configured to transmit the setting information generated by the determination circuit to the in-vehicle device; and
a setting circuit configured to change settings of the terminal device to be appropriate for the virtual configuration determined by the determination circuit.

10. An in-vehicle device comprising:
a transmission circuit configured to transmit in-vehicle configuration information about a hardware configuration of the in-vehicle device;
a receiving circuit configured to receive setting information for implementing a virtual configuration determined on the basis of terminal configuration information on a hardware configuration of a terminal device and the in-vehicle configuration information transmitted by the transmission circuit, the virtual configuration being required for performing predetermined processing; and a setting circuit configured to change settings of the in-vehicle device on the basis of the setting information received by the receiving circuit.

11. A virtualization method in a terminal device, the virtualization method comprising:

acquiring in-vehicle configuration information about a hardware configuration of an in-vehicle device;

determining a virtual configuration of the terminal device and the in-vehicle device on the basis of the acquired in-vehicle configuration information and terminal configuration information about a hardware configuration of the terminal device, the virtual configuration being required for performing predetermined processing;

generating setting information for implementing the determined virtual configuration and transmitting the setting information to the in-vehicle device; and changing settings of the terminal device to be appropriate for the determined virtual configuration.

12. A virtualization method in an in-vehicle device, the virtualization method comprising:

transmitting to a terminal device an in-vehicle configuration information about a hardware configuration of the in-vehicle device;

receiving, from the terminal device, setting information for implementing a virtual configuration determined on the basis of terminal configuration information about a hardware configuration of the terminal device and the transmitted in-vehicle configuration information, the virtual configuration being required for performing predetermined processing; and changing settings of the in-vehicle device on the basis of the received setting information.

* * * * *